United States Patent
Cheng et al.

(10) Patent No.: US 10,548,188 B2
(45) Date of Patent: *Jan. 28, 2020

(54) CONSTANT CURRENT LINEAR DRIVER WITH HIGH POWER FACTOR

(71) Applicant: Diodes Incorporated, Plano, TX (US)

(72) Inventors: Dongjie Cheng, Murphy, TX (US); John Huang, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,820

(22) Filed: Feb. 25, 2019

(65) Prior Publication Data

US 2019/0327801 A1 Oct. 24, 2019

Related U.S. Application Data

(63) Continuation of application No. 15/956,732, filed on Apr. 18, 2018, now Pat. No. 10,314,122.

(51) Int. Cl.
*H05B 33/08* (2006.01)

(52) U.S. Cl.
CPC ....... *H05B 33/0812* (2013.01); *H05B 33/083* (2013.01); *H05B 33/0815* (2013.01)

(58) Field of Classification Search
CPC ............ H05B 33/0812; H05B 33/0815; H05B 33/0803; H05B 33/0809; H05B 33/0827; H05B 33/083; H05B 33/0854; H05B 37/02; H05B 33/0824; Y02B 20/345; Y02B 20/346; Y02B 20/347
See application file for complete search history.

(56) References Cited

U.S. PATENT DOCUMENTS

| | | | |
|---|---|---|---|
| 8,217,588 B2* | 7/2012 | McKinney | H05B 33/0815 315/119 |
| 8,319,442 B2 | 11/2012 | Lin et al. | |
| 8,456,097 B2* | 6/2013 | McKinney | H05B 33/0812 315/224 |
| 8,569,956 B2* | 10/2013 | Shteynberg | H05B 33/083 315/123 |
| 8,686,651 B2 | 4/2014 | Lynch et al. | |
| 9,107,258 B1 | 8/2015 | Chao et al. | |
| 9,491,822 B2 | 11/2016 | Wu et al. | |
| 9,661,696 B1 | 5/2017 | Chen et al. | |
| 10,314,122 B1* | 6/2019 | Cheng | H05B 33/0812 |
| 2008/0094000 A1 | 4/2008 | Yamamoto et al. | |
| 2015/0351193 A1 | 12/2015 | Chao et al. | |

OTHER PUBLICATIONS

U.S. Appl. No. 15/956,732, Notice of Allowance dated Sep. 25, 2018, 9 pages.

* cited by examiner

*Primary Examiner* — Haissa Philogene

(57) ABSTRACT

A controller for controlling a plurality of serially-connected LED strings includes a reference voltage generator configured to generate a plurality of reference voltages. The reference voltage generator is further configured to vary the plurality of reference voltages based on a sampled voltage signal. The sampled voltage signal can include one or both of a peak voltage of the rectified input AC voltage and a peak voltage of an LED diode forward voltage Vf. The controller further includes a plurality of linear regulators, each linear regulator coupled between a cathode of a corresponding LED string and a common current sense node, and each linear regulator is configured to regulate a current through a corresponding LED string according to a corresponding reference voltage.

20 Claims, 15 Drawing Sheets

CONSTANT CURRENT LINEAR DRIVER WITH HIGH POWER FACTOR

BACKGROUND OF THE INVENTION

This application is a continuation application and claims priority to U.S. patent application Ser. No. 15/956,732, filed Apr. 18, 2018, titled "CONSTANT CURRENT LINEAR DRIVER WITH HIGH POWER FACTOR," the content of which is incorporated herein by reference in its entirety.

Light-emitting diodes (LED) offer many advantages over conventional lighting apparatus, such as long lifetime, high efficiency, and non-toxic materials. With the development of electronic technology, light-emitting diodes are finding ever wider applications. For example, in consumer applications, LED light bulbs are showing promise as replacements for conventional white light incandescent or fluorescent light bulbs. Further, more and more electronic devices adopt LCD as display, and LEDs are becoming increasingly popular as a backlight source.

Constant-current linear regulators are widely used as LED drivers because of their simplicity, low cost, stability, and suitability for PWM dimming. In order to provide a high power factor, a conventional LED controller uses linear regulators to control a string of LEDs. The controller can vary the number of LEDs to be turned on according to the magnitude of the input voltage. In other words, the controller turns on more LEDs in the string as the input voltage increases and reduces the number of turned-on LEDs as the voltage decreases. As a result, the total current flowing through the LED strings varies in a staircase manner that tracks the input voltage, thereby improving the power factor.

A disadvantage of these controllers is that the total LED current can vary with changes in supply voltage or operating temperature. For example, the total LED current is higher at a higher input voltage, and the LED current is lower at a lower input voltage. As a result, the brightness of the LED string can vary with the input voltage. These controllers can also be susceptible to LED forward voltage Vf variation due to device-to-device variations and temperature coefficient (TC). These conditions prevent the LED currents from having a desired steady average LED current leading to variations in the brightness of the LED lighting device.

BRIEF SUMMARY OF THE INVENTION

The inventors have identified that a cause for the LED brightness variation described above. To get a good power factor, in a PF (power factor) controller an LED is turned on when voltage across the LED is equal to or higher than Diode Vf voltage, and is turned off when voltage across the LED is lower than Vf. When LED is ON, current is regulated by a linear feedback loop. The conventional controller uses fixed reference voltages to control the linear regulators. As a result, the LED current corresponding to the sequential turn-on steps is activated at fixed fractions of the input voltage. Therefore any voltage fluctuation from the rectifier (AC amplitude change) or Vf fluctuation from LED can change the timing of the LED turn-on and turn-off. This LED on/off timing fluctuation will cause the changes in the total power into the LED and in turn make the total lumen unstable as perceived.

This invention teaches an LED controller for controlling a number of LED diodes connected in series in a lighting device that can provide a high power factor and can maintain a constant brightness under conditions of changing peak voltage of the AC voltage supply, LED diode forward voltage, or temperature. The high power factor is achieved by maintaining the LED current in phase with the rectified AC input voltage. The LED diodes may be turned on in stages sequentially according to the variation of the rectified AC input voltage. The constant brightness is achieved by varying the transition point of the stages, e.g., by varying current setting voltage references, according to the peak voltage of the rectified AC input voltage.

As an example, the invention teaches an LED controller for controlling a plurality of LED strings that are connected in series. An LED string can have one or more LED diodes. The LED controller includes an input node for receiving a rectified input AC voltage from a rectifier circuit and a current sense node for sensing current flow in the LED strings. The LED controller also includes a plurality of linear regulators. Each linear regulator is coupled between a corresponding LED string and the current sense node. Each linear regulator is coupled to a reference voltage and controls a current flow through the corresponding LED string based on the reference voltage. A reference voltage generator provides the reference voltages such that a successively higher reference voltage is coupled to a linear regulator coupled to an LED string further down the series. Such arrangement allows the LED controller to turn on the LED strings in sequence and can keep the LED current in phase with the rectified AC input voltage to maintains a higher power factor. Further, the reference voltage generator receives the rectified input AC voltage and provides the plurality of reference voltages based on the peak voltage of the rectified input AC voltage, such that each of the plurality of reference voltages is adjusted lower for a rectified input AC voltage with a higher peak voltage.

In an example, the reference voltage generator can include a band-gap voltage generator, a peak voltage detector, and an operational amplifier. The band-gap voltage generator provides a band-gap reference voltage. The peak voltage detector is coupled to the rectified AC input voltage and generates a peak voltage signal representing a peak voltage of the rectified AC input voltage. The operational amplifier has a positive input node coupled to the band-gap reference voltage, a negative input node coupled to the peak voltage signal, and an output node for providing a base reference voltage that varies inversely with the peak voltage of the rectified input AC voltage. The reference voltage generator can also include a voltage divider circuit for receiving the base reference voltage and deriving the plurality of reference voltages.

In another example, the reference voltage generator can have a peak voltage detector for receiving a sampled LED diode forward voltage signal Vf from an LED diode in an LED string, and provides a base reference voltage that varies proportionally with the sampled LED diode forward voltage signal Vf.

In yet another example, the reference voltage generator can have a peak voltage detector for coupling to a cathode of one of the plurality of LED strings to receive a sampled voltage for tracking changes in the peak voltage of the rectified AC input voltage and LED diode forward voltage.

Each of the linear regulators can have a transistor for controlling current flow in a current path and an operational amplifier for providing a control signal to control the transistor. The operational amplifier receives at the first input terminal a preset reference voltage and receives at the second input terminal a feedback signal from the current path. The operational amplifier also outputs a control signal for controlling current flow in the current path.

DEFINITIONS

The terms used in this disclosure generally have their ordinary meanings in the art within the context of the invention. Certain terms are discussed below to provide additional guidance to the practitioners regarding the description of the invention. It will be appreciated that the same thing may be said in more than one way. Consequently, alternative language and synonyms may be used.

A regulator or voltage regulator is a device for automatically maintaining a constant voltage level.

A linear regulator is an electronic circuit used to maintain a steady voltage. Linear regulators may place the regulating device in parallel with the load (shunt regulator) or may place the regulating device between the source and the regulated load (a series regulator). The regulating device is made to act like a variable resistor, continuously adjusting a voltage divider network to maintain a constant output voltage, and continually dissipating power. By contrast, a switching regulator uses an active device that switches on and off to maintain an average value of output.

A constant-current regulator is a regulator that provides a constant output current. A constant current or constant voltage is understood to be a current or voltage that maintains a constant value with a range of deviation depending on design and manufacturing process variations or within a limitation according to a specification, for example, within ±10%, ±5%, or ±1%.

A light-emitting diode (LED) is a two-lead semiconductor light source. It is a p-n junction diode, which emits light when activated by a current. When a suitable voltage is applied to the leads, electrons are able to recombine with holes within the device, releasing energy in the form of photons.

A diode forward voltage is the voltage dropped across a conducting, forward-biased diode. For example, silicon P-N junction diodes can have a forward voltage of approximately 0.7 volts, depending on the doping concentration in the P and N regions.

An LED string is two or more LED diodes connected in series.

An operational amplifier (op-amp or opamp) refers to a DC-coupled high-gain electronic voltage amplifier with a differential input and, usually, a single-ended output. An operational amplifier can be characterized by a high input impedance and a low output impedance, and can be used to perform mathematical operations in analog circuits.

A voltage reference is an electronic device that ideally produces a fixed (constant) voltage irrespective of the loading on the device, power supply variations, temperature changes, and the passage of time.

A band-gap voltage generator (or bandgap voltage reference) is a temperature independent voltage reference circuit used in integrated circuits. It is configured to produce a fixed (constant) voltage regardless of power supply variations, temperature changes, and circuit loading from a device. It commonly has an output voltage around 1.25 V (close to the theoretical 1.22 eV bandgap of silicon at 0 K).

A reference voltage is a voltage value that is used as a target for a comparison operation.

An analog signal is a continuous signal having a time varying feature. It differs from a digital signal, which includes a sequence of discrete values which may only take on one of a finite number of values.

A feedback control loop refers to a feedback system arranged to regulate an output at a set point or reference value. Feedback occurs when outputs of a system are routed back to inputs as part of a chain that forms a circuit or loop.

The power factor of an AC electrical power system is defined as the ratio of the real power flowing to the load to the apparent power in the circuit. A load with a low power factor draws more current than a load with a high power factor for the same amount of useful power transferred. A load with a low power factor has higher energy lost in the distribution system.

When the term "the same" is used to describe two quantities, it means that the values of two quantities are determined the same within measurement limitations.

DETAILED DESCRIPTION OF THE INVENTION

The invention teaches a linear-regulator based high power factor controller that can provide constant current by using reference voltages that track the changes in peak supply voltage and/or temperature. In a specific example, the peak value of the input voltage is used to modify the reference voltages. In another example, the forward voltage of an LED or an LED string is used as a representation of the temperature to modify the reference voltages. In yet another example, both the input voltage and LED forward voltage are monitored to modify the reference voltages. Therefore, in addition to providing a high power factor, a cost effective LED driver is described that can provide a constant LED light brightness perceived by the user, which can be measured by lumen. The brightness can be related to the LED current over a cycle of the rectified time-varying current, which can be measured by the average value of LED current or the RMS (root-mean-square) value of LED current.

Figure 1:
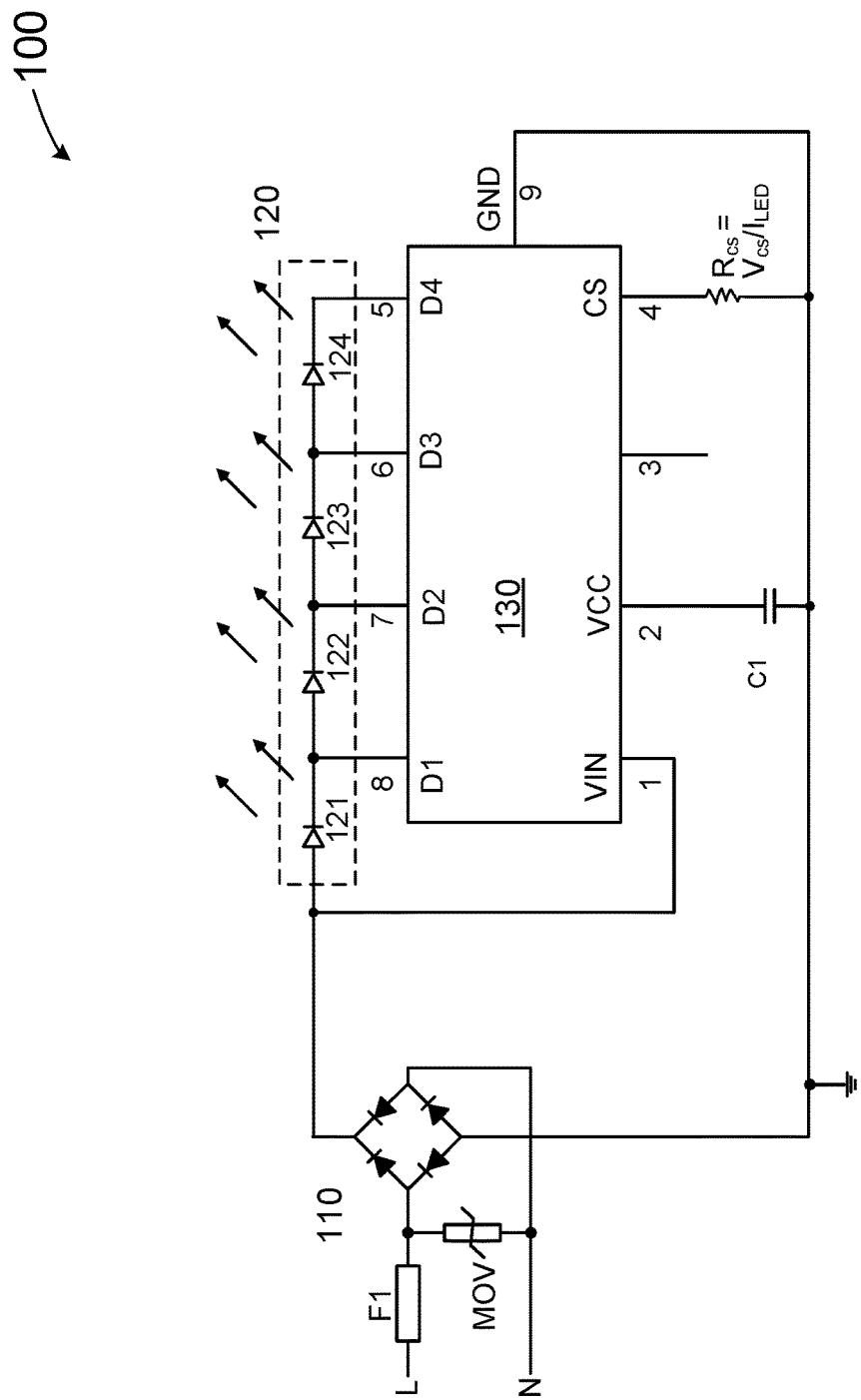
FIG. 1 is a simplified block diagram illustrating an LED lighting device that embodies certain aspects of this invention.

FIG. 1 is a simplified block diagram illustrating an LED lighting device that embodies certain aspects of this invention. As shown in FIG. 1, LED lighting device 100 includes a rectifier 110 for converting an AC input voltage VAC to a rectified input voltage Vin, which can be a time-varying DC voltage. LED lighting device 100 also has an LED lamp 120 and a control circuit 130. LED lamp 120 can have multiple serially-connected LED strings. In the example of FIG. 1, LED lamp 120 has multiple LED strings, 121, 122, 123, and 124, that are serially-connected. Each of the four LED strings, 121-124, can have one or more light-emitting-diodes (LEDs). Control circuit 130 can maintain a constant LED lumen while providing a high power factor even under the condition of AC input voltage fluctuation or LED forward voltage variations.

Figure 2:
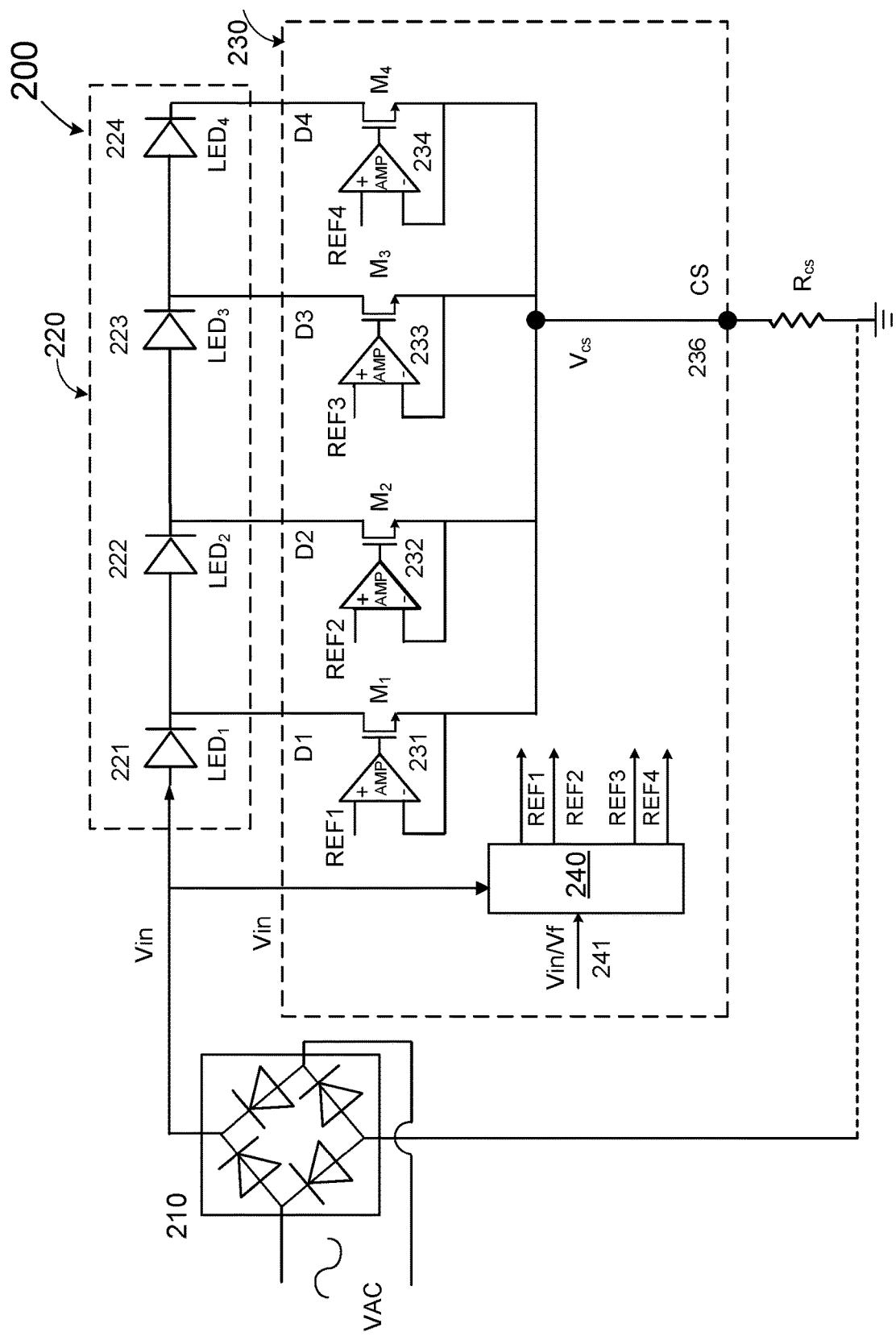
FIG. 2 is a simplified schematic diagram illustrating an LED lighting device that embodies certain aspects of this invention.

FIG. 2 is a simplified schematic diagram illustrating an LED lighting device that embodies certain aspects of this invention. As shown in FIG. 2, LED lighting device 200 includes a rectifier 210 for converting an AC input voltage VAC to a rectified input voltage Vin, which can be a time-varying DC voltage. LED lighting device 200 also has an LED lamp 220 and a control circuit 230. LED lamp 220 can have multiple serially-connected LED strings. In the example of FIG. 2, LED lamp 220 has multiple LED strings, 221, 222, 223, and 224, that are serially-connected. Each of the four LED strings, 221-224, can have one or more light-emitting-diodes (LEDs).

To simplify the illustration, in this example, LED lamp 220 shows only four LED strings. However, it is understood that any number of LED strings can be used in the LED lamp. Further, a plurality of LEDs can be grouped into a different number of strings.

In the example of FIG. 2, control circuit 230 is a linear LED driver and power factor (PF) controller IC, which can provide a 4-stage (or 4-channel) current control scheme. Control circuit 230 has four nodes, or four current pins, D1, D2, D3, and D4 for coupling to the cathodes of four LEDs, 221-224, respectively, for providing four different current paths. The four nodes, D1, D2, D3, and D4 are coupled to four linear regulators 231, 232, 233, and 234, respectively. The linear regulators 231, 232, 233, and 234 are coupled to a current sense node CS 236, which can be coupled to a current sense resistor Rcs. The voltage at current sense node 236 is labeled Vcs, which is the voltage across current sense resistor Rcs and represents an LED current flowing through the current paths.

Each of the linear regulators 231-234 has a transistor M1-M4 coupled to an LED current path, and an amplifier AMP in a feedback control loop configuration with the transistor. Each of the amplifiers receives a reference voltage REF1-REF4, and maintains the voltage at the source terminal of the transistor at the reference voltage. Therefore, the linear operator can maintain the current through the transistor at a constant determined by the reference voltage and the current sense resistor Rcs, for example REF1/Rcs, REF2/Rcs, REF3/Rcs, and REF4/Rcs.

The operation of the linear regulators 231-234 can be explained using the first linear regulator 231 as an example. In linear regulator 231, an operational amplifier (op-amp) AMP is used in a feedback loop to regulate current in the LED load 221 at a target current value as determined by reference voltage REF1. An output of op-amp AMP is coupled to a switch transistor M1 coupled to LED load 221. The LED load current is controlled by switch transistor M1 and sensed at a sense resistor Rcs. The voltage Vcs at sense resistor Rcs is taken at node 236 (CS) and is used as a feedback voltage that is coupled to a minus input of op-amp AMP. Op-amp AMP functions to keep Vcs equal to REF1, thus maintaining the LED current at a target value REF1/Rcs. With PWM dimming, the PWM pulse is used as an enable signal (EN) for the operational amplifier. Op-amp AMP can also be enabled or disabled by a dimming signal, which is not described in detail here.

Control circuit 230 also includes a reference voltage generator 240, which provides reference voltages REF1-REF4, such that REF 1<REF2<REF3<REF4. Controller 230 can provide an LED driver having a high power factor, as explained below with reference to FIG. 3. Further, the inventor has observed that the brightness of the lighting device 200 can vary as a result of variations in the LED current due to changes in operating conditions, such as changes in the input voltage VIN or changes in LED diode forward voltages Vf. Therefore, reference voltage generator 240 also receives a sampled voltage signal 241 Vin/Vf in order to modify reference voltages REF1-REF4 to maintain consistent brightness of the lighting device. The sampled voltage signal can represent changes in input voltage VIN and/or changes in LED diode forward voltages Vf, as described further below.

Figure 3:
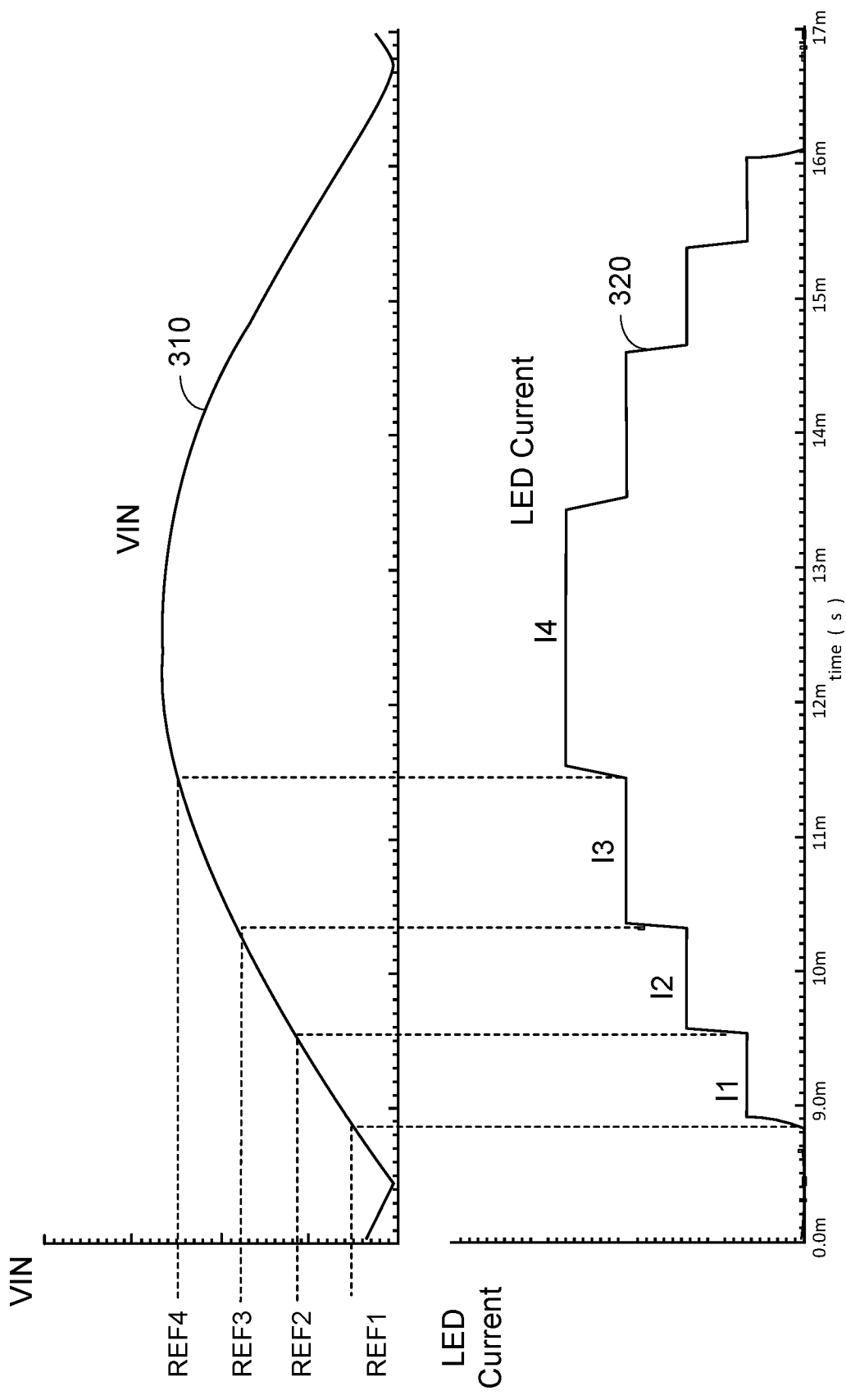
FIG. 3 is a waveform diagram illustrating LED current vs. rectified input voltage under the control of the control circuit of FIG. 2 that embodies certain aspects of this invention.

FIG. 3 is a waveform diagram illustrating LED current vs. rectified input voltage under the control of the control circuit of FIG. 2 that embodies certain aspects of this invention. Control circuit 230 regulates LED current by sequentially sinking current into the four LED current pins D1-D4. This can be explained with reference to FIGS. 2 and 3. Within a rectified AC power sinusoidal cycle, only one of the four current paths conducts current at one time. For example, node D1 starts sinking current as soon as the voltage between VIN and D1 reaches a sufficient voltage (i.e., a voltage higher than the forward diode voltage Vf) for the first LED string between VIN and current path D1 to conduct current. Reference voltage REF1 in linear regulator 231 is selected to regulate the voltage at the CS Pin Vcs to be 25% of a max reference voltage to set the current in the D1 current path at less than or equal to 25% of the LED peak current. As shown in FIG. 3, the LED current 320 is maintained at a first level I1 after VIN 310 reaches a high enough voltage (as set by reference voltage REF1) to turn on the D1 channel.

Similarly, current path through node D2 is the second path to start sinking current when the voltage between D1 and D2 reaches a sufficient value for the second LED string 222 between D1 and D2 to conduct current. For D2, reference voltage REF2 in linear regulator 232 is selected to regulate the voltage at pin CS to be 50% of the max reference voltage. At the same time of D2 turning on, linear regulator 231 turns off current path D1 because the voltage at the negative input of the amplifier is now higher than REF1, allowing all the current I2 to flow through first and second LED strings after VIN 310 reaches a high enough voltage (as set by reference voltage REF2) to turn on the D2 channel. In a similar manner, the current path through D3 is the third stage to start sinking current when the voltage between nodes D2 and D3 reaches sufficient value for the third LED string 223 between D2 and D3 to conduct current. For D3, reference voltage REF3 in linear regulator 223 is selected to regulate the voltage at pin CS to be 75% of the max reference voltage. At this time, VIN 310 reaches a voltage as set by REF3, and linear regulator 233 turns off D2, allowing all the current 13 to flow through first, second, and third LED strings, and through node D3 to current sense node CS 236. This process continues until the last current path through D4 is activated, at which time the control circuit regulates the voltage of CS pin to be 100% of max reference voltage, and the first three stages D1, D2, and D3 are all turned off, so that all current 14 now flows through all LED strings and the current sensing resistor Rcs, after VIN 310 reaches a voltage as set by REF4.

VIN is the rectified AC voltage, which rises and falls during one half of an AC cycle. Under control circuit 230 regulation, the LED current flowing through the current sense node 236 increases with the rising magnitude of rectified AC voltage. Similarly, the LED current flowing through the current sense node 236 decreases with the falling magnitude of rectified AC voltage. In this manner, the magnitude of the LED current follows the rising and falling magnitude of the rectified AC voltage, as shown in FIG. 3. As a result, control circuit 230 can provide a high power factor in the LED lighting device.

As described above, the control circuit in FIG. 2 can provide a high power factor in the LED lighting device by sequentially sinking current into different LED current paths. However, the brightness of the LED lighting device can vary with the timing of transitions into different LED current, which can be affected by the peak AC input voltage and the diode forward voltage of the LEDs.

Figure 4A:
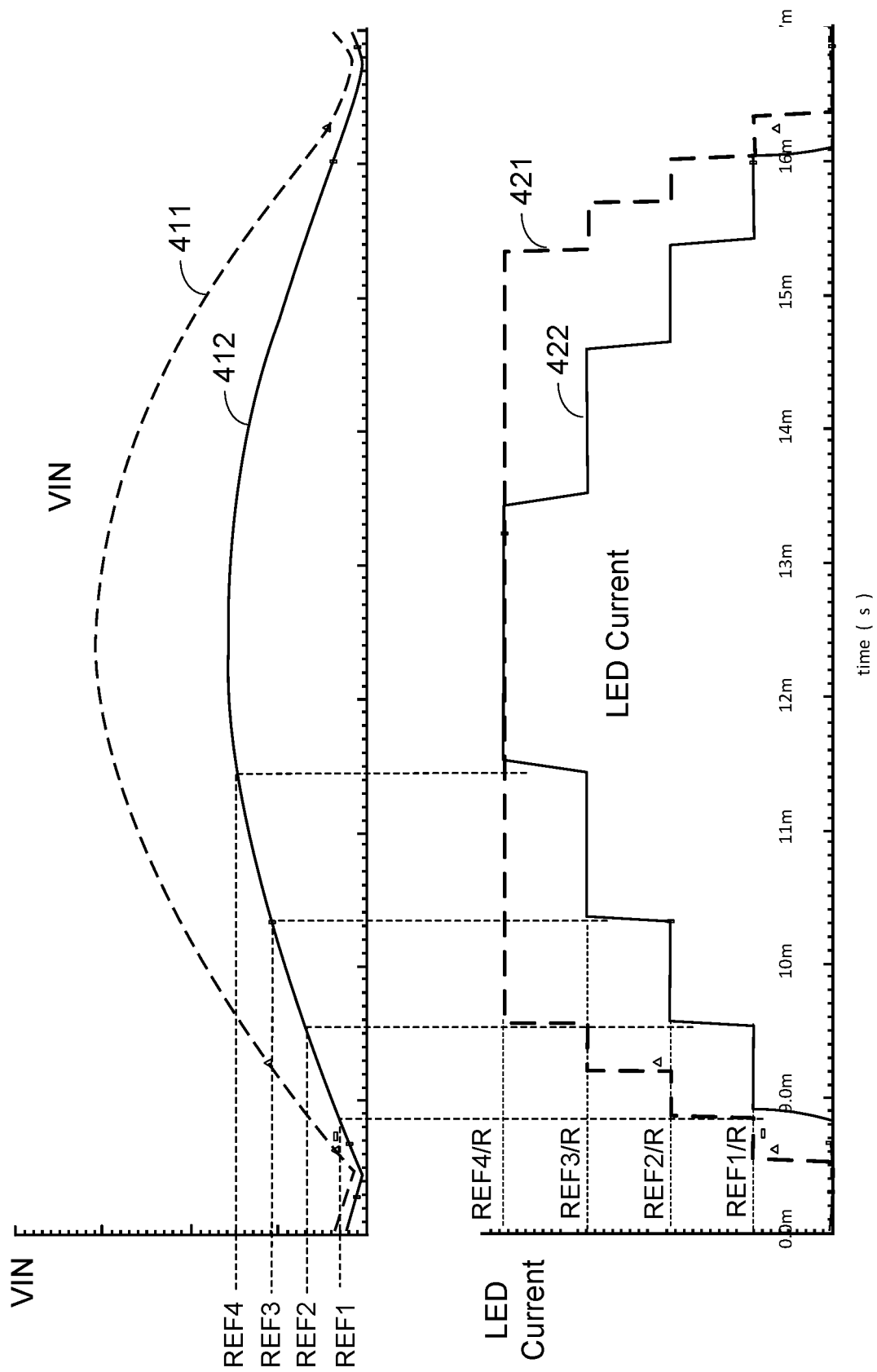
FIG. 4A is a waveform diagram illustrating LED current vs. two rectified input voltages with different peak voltage that embodies certain aspects of this invention.

FIG. 4A is a waveform diagram illustrating LED current vs. two rectified input voltages with different peak voltage that embodies certain aspects of this invention. A rectified AC voltage 411 having a higher peak voltage (e.g., 220 VAC) can cause the LED string to turn on earlier than a rectified AC voltage 412 having a lower peak voltage (e.g., 115 VAC), if the reference voltages REF1-REF4 for the linear regulators are fixed. The system can produce a quasi-sinewave shaped LED current waveform 421 that is wider at higher AC amplitude (e.g., 220 VAC) than that at a lower AC amplitude 422 (e.g., 115 VAC). Therefore, the average LED current (or total LED current in an AC cycle) can vary with the peak AC amplitude, causing the brightness of the LED lamp to vary. For example, the higher the peak AC amplitude, the earlier the first LED string turns on by the D1 current path circuit in the AC voltage cycle, so that the total or average LED current is higher at higher AC amplitude.

Similarly, LEDs having lower diode forward voltages can be turned on at lower voltages, i.e., earlier in the AC voltage cycle. Thus, variations in diode forward voltages can also cause changes in the brightness of the LED lighting device if the reference voltages in the controller of FIG. 2 remain fixed for diodes with different forward voltages.

The invention teaches adjusting the reference voltages to compensate for the variations in the peak voltage of the rectified input voltage and/or the variations in the LED diode turn on voltages. For example, the reference voltages can be lowered for higher supply voltage (VIN) or lower diode forward voltage (Vf), such that the average LED current can be held constant. Similarly, the reference voltages can be increased for lower supply voltage (VIN) or higher diode forward voltage (Vf), such that the average LED current can be held constant.

Figure 4B:
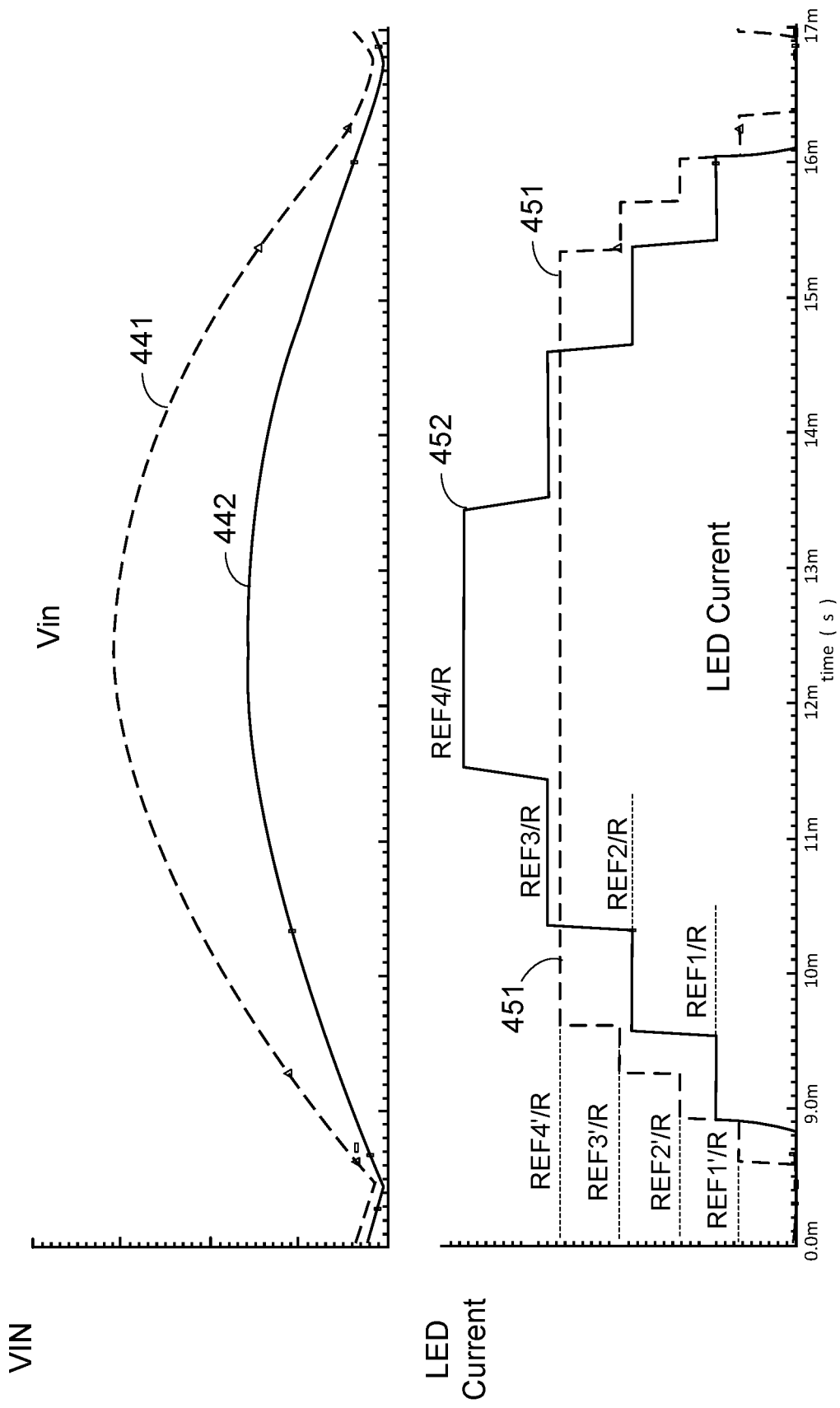
FIG. 4B is a waveform diagram illustrating LED current vs. two rectified input voltages with different peak voltage that embodies certain aspects of this invention.

FIG. 4B is a waveform diagram illustrating LED current vs. two rectified input voltages with different peak voltage that embodies certain aspects of this invention. In this example, the reference voltages REF1-REF4 for the linear regulators are adjusted such that the reference voltages are lowered for a higher input voltage Vin to lower the LED current at each stage of the input voltage cycle. As shown in FIG. 4B, a rectified AC voltage VIN 441 having a higher peak voltage (e.g., 220 VAC) can cause the LED string to turn on earlier than a rectified AC voltage 442 having a lower peak voltage (e.g., 115 VAC). LED current waveform 451 at each stage of the cycle of VIN is wider at higher AC amplitude (e.g., 220 VAC) than that at a lower AC amplitude 452 (e.g., 115 VAC). However, the magnitude of LED current waveform 451 at each stage of the VIN cycle is lower for the VIN with the higher peak voltage than the magnitude of LED current waveform 452 with the lower peak voltage, because the reference voltages REF1-REF4 are adjusted to lower values for the VIN with higher peak voltage. As a result, the total LED current in a VIN cycle, or equivalently, the average LED current, can be maintained. Therefore, the brightness of the LED lighting device, which can be measured in lumens, can be maintained.

As an example, the control functions described above can be implemented by designing the system at a predefined AC amplitude (e.g., 220 Vac) and a nominal LED Vf (e.g., 3V) to satisfy a user required LED RMS current. During an AC cycle, the LED current is configured to be a function of LED's ON time (duration between turn on and turn off). For example, if an LED in a certain channel turns on for a longer time duration than in the nominal case, this LED current is lowered to have an inversely proportional change to make the LED RMS current (or the sum or integration of the current in an AC cycle) constant.

Figure 5:
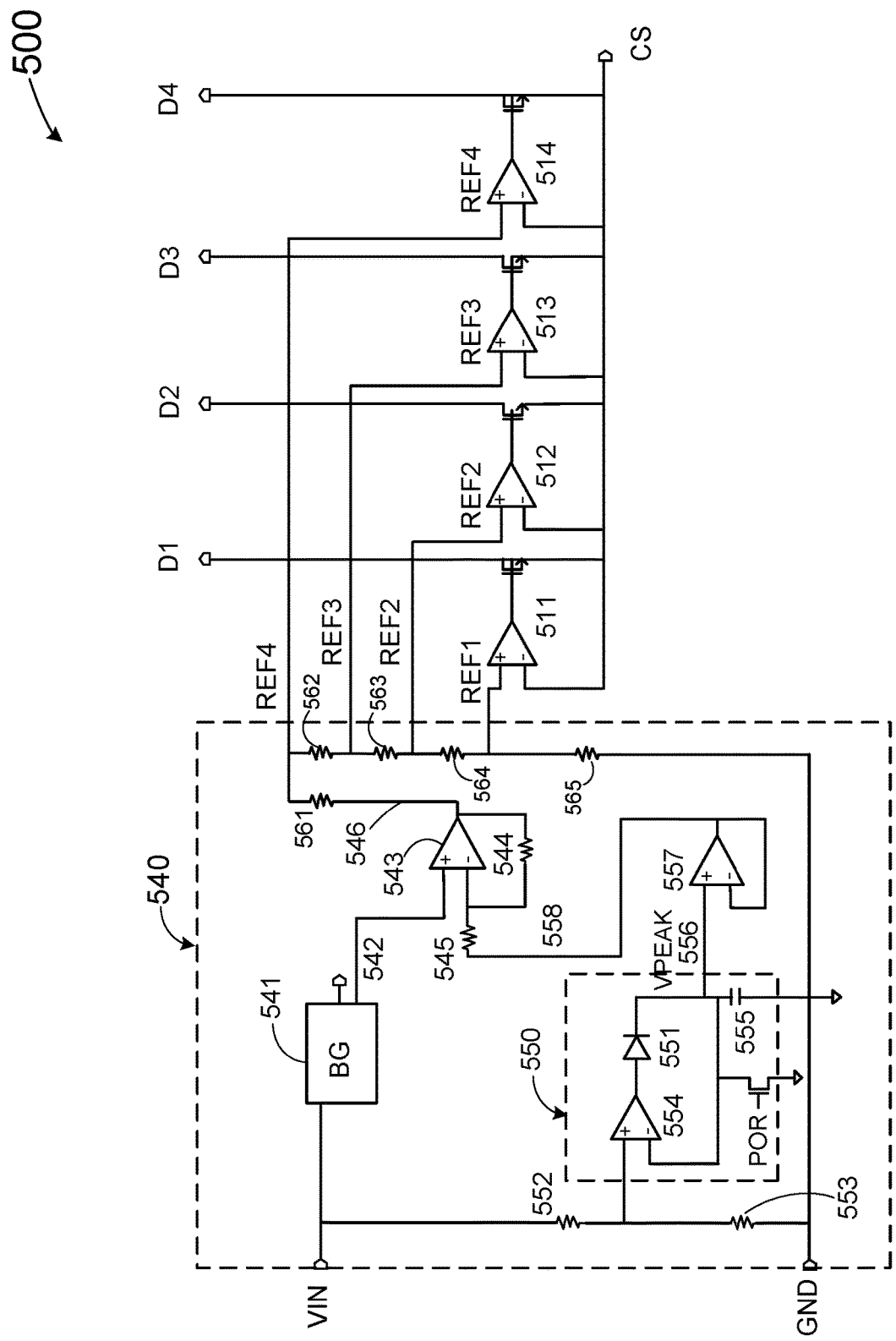
FIG. 5 is a simplified schematic diagram illustrating an LED control circuit that embodies certain aspects of this invention.

FIG. 5 is a simplified schematic diagram illustrating an LED control circuit 500 that embodies certain aspects of this invention. Control circuit 500 is an example of a control circuit that can be used in the LED lighting device in FIG. 2. Similar to control circuit 230 in FIG. 2, control circuit 500 has four terminals D1-D4 for providing current paths to LED strings and four linear regulators 511-514 for controlling the current in each current path, based on one of four reference voltages REF1-REF4. Further, control circuit 500 also includes a reference voltage generator 540 for generating the four reference voltages REF1-REF4. The operation of control circuit 500 is similar to the operation of control circuit 230 described above. Control circuit 500 illustrates an exemplary implementation of a reference voltage generator.

As shown in FIG. 5, reference voltage generator 540 includes a peak voltage detector 550 for detecting the variations of rectified input voltage VIN. Peak voltage detector 550 can be connected to rectified input voltage VIN through a voltage divider formed by resistors 552 and 553. Peak voltage detector 550 can also include an amplifier 554, a diode 551, a power-up reset switch POR, and a capacitor 555 with parasitic discharge path (not shown) so that the peak detector can be reset and detect new peaks, and provides a signal VPEAK 556 representing a sampled version of VIN. Sampled signal VPEAK 556 is buffered at amplifier 557 to provide a signal 558 representing a sampled version of VIN. Reference voltage generator 540 also includes a bandgap reference circuit 541 for providing a reference voltage 542. Amplifier 543, along with resistors 544 and 545, receives the bandgap reference signal 542 and the input voltage sampling signal 558 to provide a reference voltage 546 that tracks the variation of VIN. An output node 566 is coupled to reference voltage 546 through a resistor 561. A voltage divider, including resistors 562, 563, 564, and 565, is coupled to output node 566 and provides the reference voltages REF1-REF4 to the linear regulators 511-514. In this circuit, the condition REF1<REF2<REF3<REF4 is met. The resistance values of resistors 561-565 can be selected based on the desired voltage values of REF1-REF4.

In FIG. 5, amplifier 543 can be an operational amplifier, and has a positive terminal for receiving reference voltage 542 from bandgap reference circuit 541. Amplifier 543 also has a negative terminal for receiving input voltage sampling signal 558. Therefore, reference voltage 546 at the output of amplifier 543 is configured to vary in an opposite direction as input voltage sampling signal 558. In other words, when input voltage sampling signal 558 increases, reference voltage 546 is decreased. When input voltage sampling signal 558 decreases, reference voltage 546 is increased. Based on reference voltage 546, a voltage divider, including resistors 562, 563, 564, and 565, provides the reference voltages REF1-REF4 to the linear regulators 511-514.

Figure 6A:
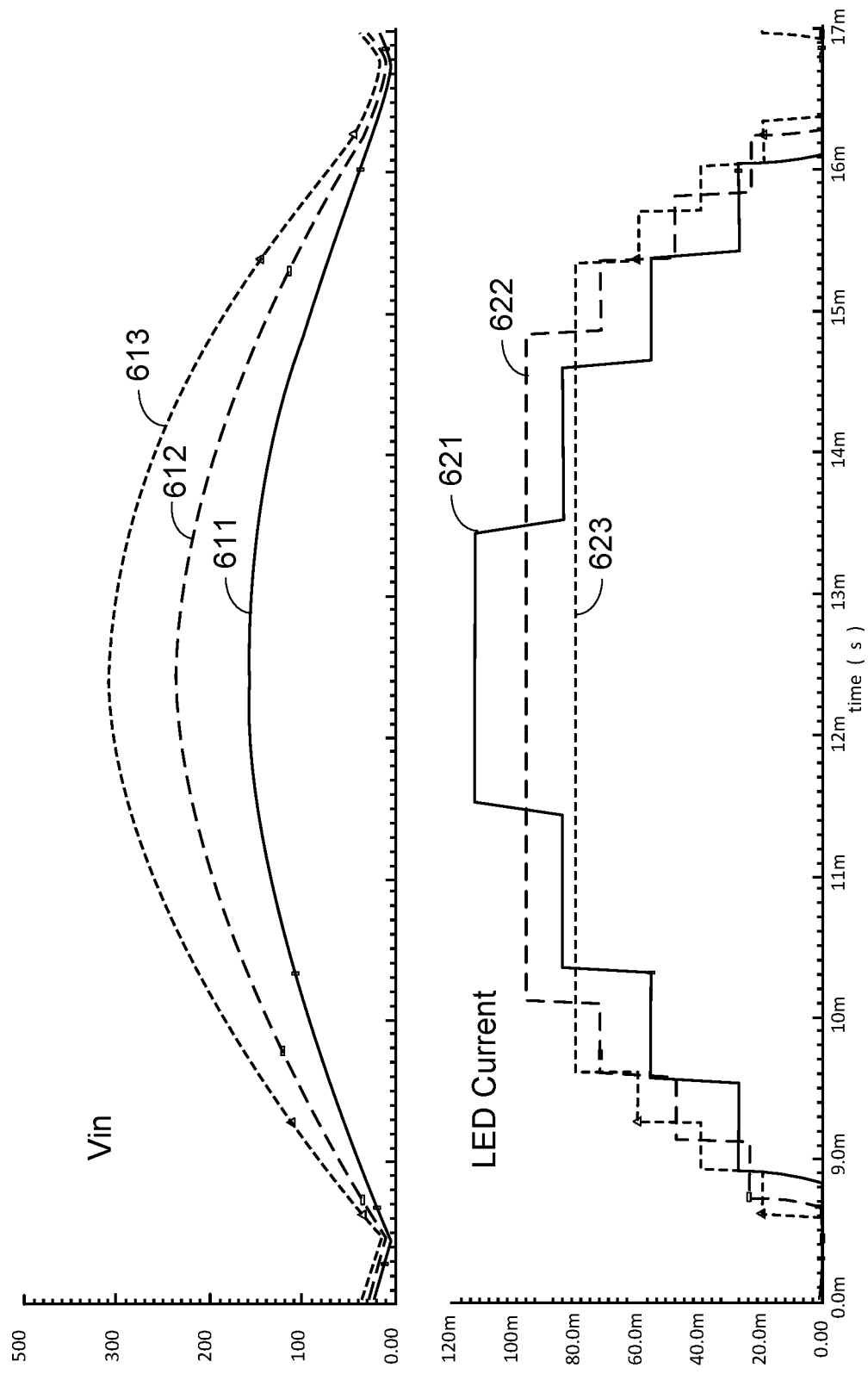
FIG. 6A is a waveform diagram illustrating a simulated LED current vs. rectified input voltages in an LED controller with adjustable reference voltages that embodies certain aspects of this invention.

FIG. 6A is a waveform diagram illustrating a simulated LED current vs. rectified input voltages in an LED controller with adjustable reference voltages that embodies certain aspects of this invention. The LED current waveforms are simulated for an LED lighting device having LED control circuit 500 of FIG. 5. Rectified input voltage 611 has a peak voltage of 160 V, rectified input voltage 612 has a peak voltage of 235 V, and rectified input voltage 613 has a peak voltage of 311 V. The reference voltages REF1-REF4 are adjusted such that the rectified input voltage 613 with the highest peak voltage of 311 V has the lowest reference voltage. And the rectified input voltage 611 with the lowest peak voltage of 160 V has the highest reference voltage. In FIG. 6A, LED current 621 for rectified input voltage 611 has the lowest peak voltage of 160 V, LED current 622 for rectified input voltage 612 has peak voltage of 235 V, and LED current 623 for rectified input voltage 613 has the highest peak voltage of 311 V. It can be seen that LED currents 621, 622, and 623 have the same total current in a half AC cycle as represented by the areas under each current curve. In other words, the average LED current is the same under the conditions of rectified voltages with different peak voltages. As a result, the brightness of the LED lighting device can be maintained.

Figure 6B:
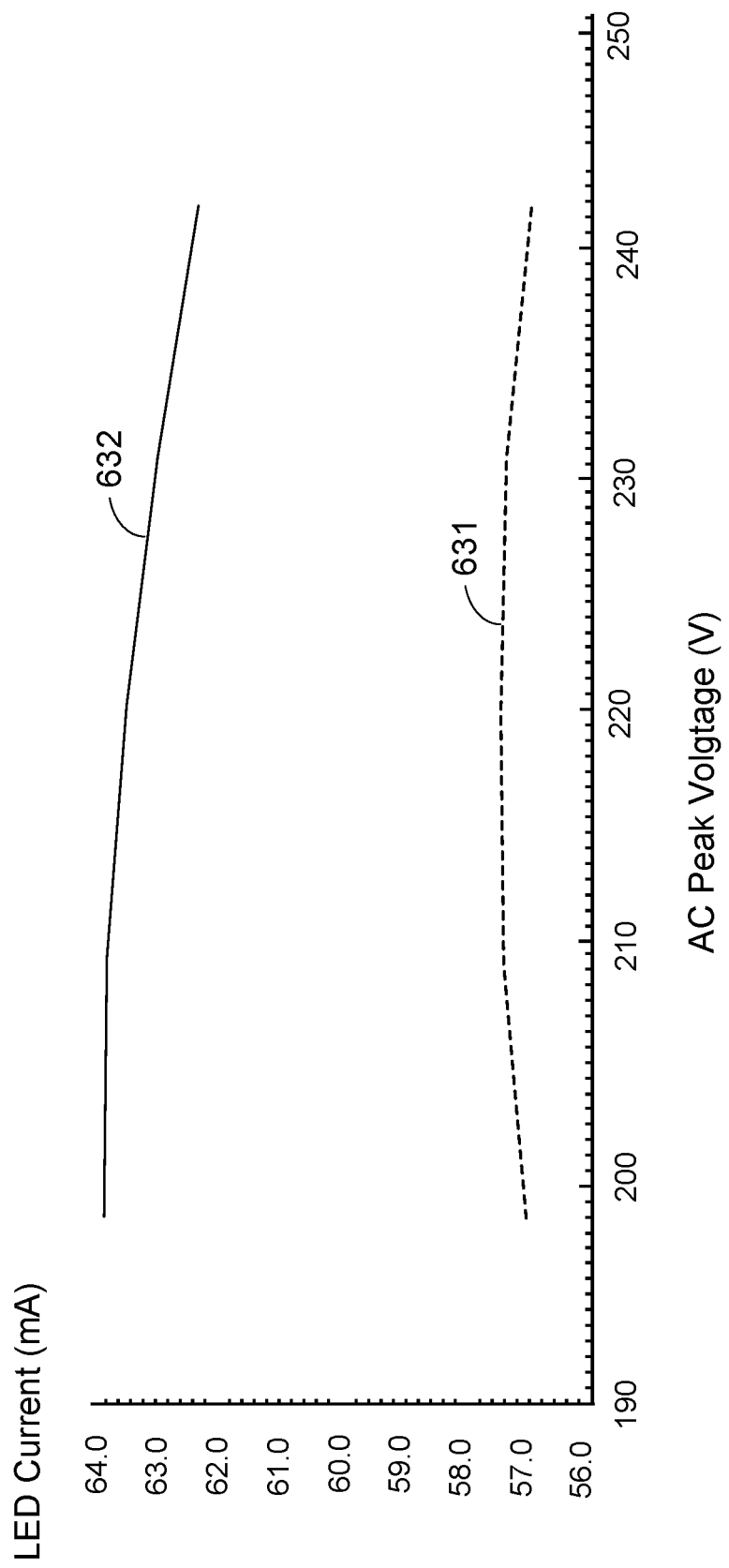
FIG. 6B is a diagram illustrating variations of LED current over a range of peak AC input voltage that embodies certain aspects of this invention.

FIG. 6B is a diagram illustrating variations of LED current over a range of peak AC input voltage that embodies certain aspects of this invention. The data shown in FIG. 6B is based on LED current waveforms simulated for an LED lighting device having an LED control circuit similar to control circuit 500 of FIG. 5. The horizontal axis shows the peak voltage of the rectified input AC voltage in volts (V) over a range of from about 200 V to 240 V, representing a ±10% variation of input AC peak voltage centered around 220 V. The vertical axis shows a range of LED current in milli-amperes (mA). Curve 631 illustrates variations in LED current averaged over an AC period varies by approximately ±0.5% over the input peak voltage range of 200 V to 240 V. Curve 632 illustrates variations in the RMS LED current over an AC period varies by approximately ±1.2% over the input peak voltage range of 200 V to 240 V. The RMS value of the current can represent the average power over the AC cycle. Thus, the LED control circuit can maintain an average LED current to within a certain percentage of a target average LED current, for example, 10%, 5%, or 2%. Therefore, whether measured by the average current or the RMS current, the LED current can be substantially constant under rectified voltages with different peak voltages. As a result, the brightness of the LED lighting device can be maintained.

Figure 7:
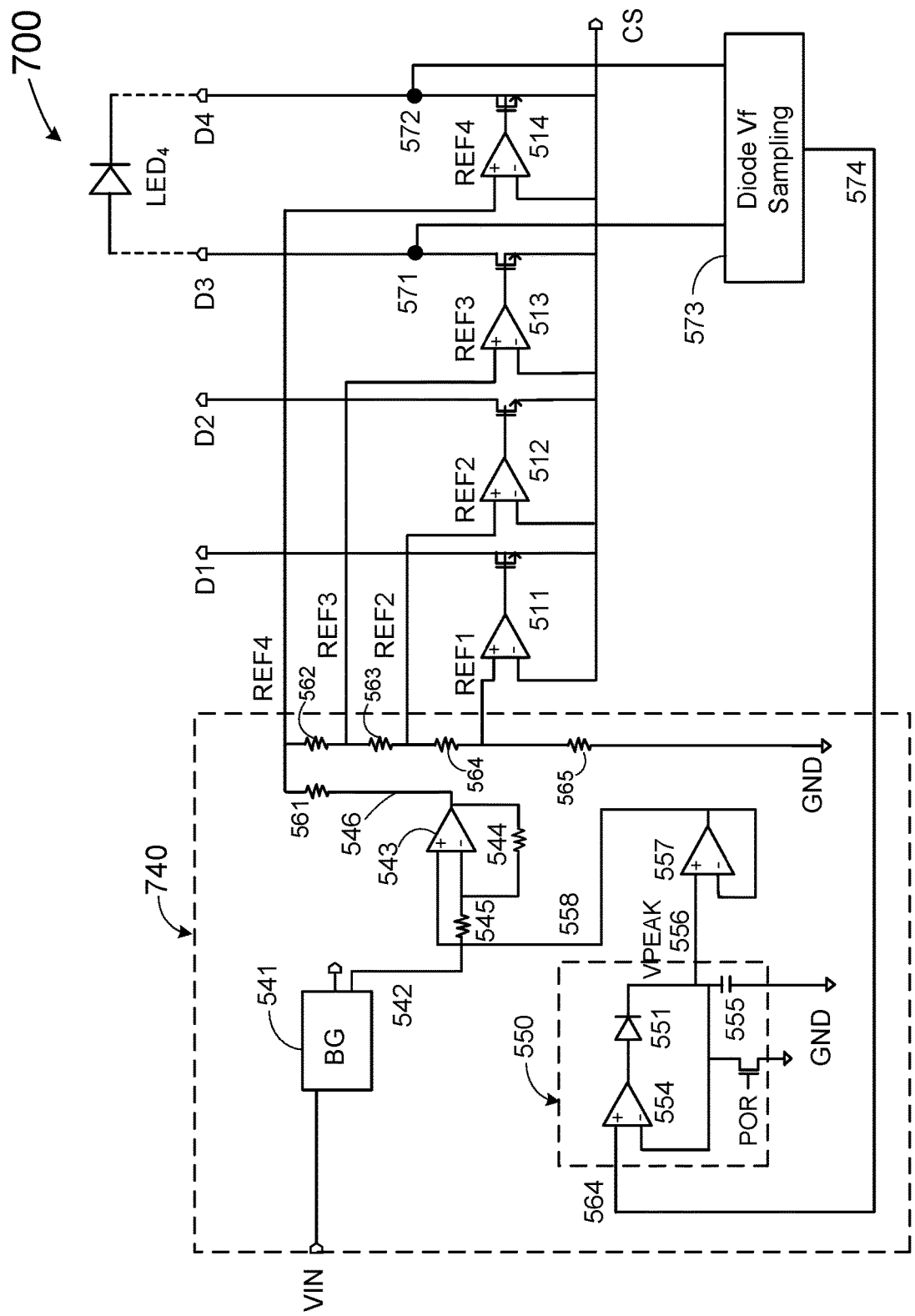
FIG. 7 is a simplified schematic diagram illustrating an LED control circuit 700 that embodies certain aspects of this invention.

FIG. 7 is a simplified schematic diagram illustrating an LED control circuit 700 that embodies certain aspects of this invention. Control circuit 700 is another example of a control circuit that can be used in the LED lighting device in FIG. 2. Similar to control circuit 500 in FIG. 5, control circuit 700 has four terminals D1-D4 for providing current paths to LED strings and four linear regulators 511-514 for controlling the current in each current path, based on one of four reference voltages REF1-REF4. Further, control circuit 700 also includes a reference voltage generator 740 for generating the four reference voltages REF1-REF4. The operation of control circuit 700 is similar to the operation of control circuit 500 described above. Different from control circuit 500, control circuit 700 illustrates an exemplary implementation of a reference voltage generator 740 that provides reference voltages REF1-REF4 based on variations of LED diode forward voltage Vf.

Reference voltage generator 740 is similar to reference voltage generator 540 in FIG. 5, with one notable difference. Reference voltage generator 540 in FIG. 5 generates a signal that represents the input voltage VIN. In contrast, reference voltage generator 740 in FIG. 7 generates a signal that represents the LED diode forward voltage Vf. As shown in FIG. 7, reference voltage generator 740 includes a diode Vf sampling circuit, or diode forward voltage sampling circuit 573 that is coupled to two nodes D3 and D4 across the LED4 diode. The coupling points are marked as 571 and 572. Diode Vf sampling circuit 573 can include circuit components such as a level shifter to produce a voltage signal 574 that represents the diode forward voltage Vf and is scaled properly for peak voltage detection circuit 550. Similar to reference voltage generator 540 in FIG. 5, reference voltage generator 740 modifies reference voltages REF1-REF4 to the linear regulators 511-514. In this circuit, the condition REF1<REF2<REF3<REF4 is met. The resistance values of resistors 561-565 can be selected based on the desired voltage values of REF1-REF4 and the sampled diode forward voltage Vf.

Figure 8:
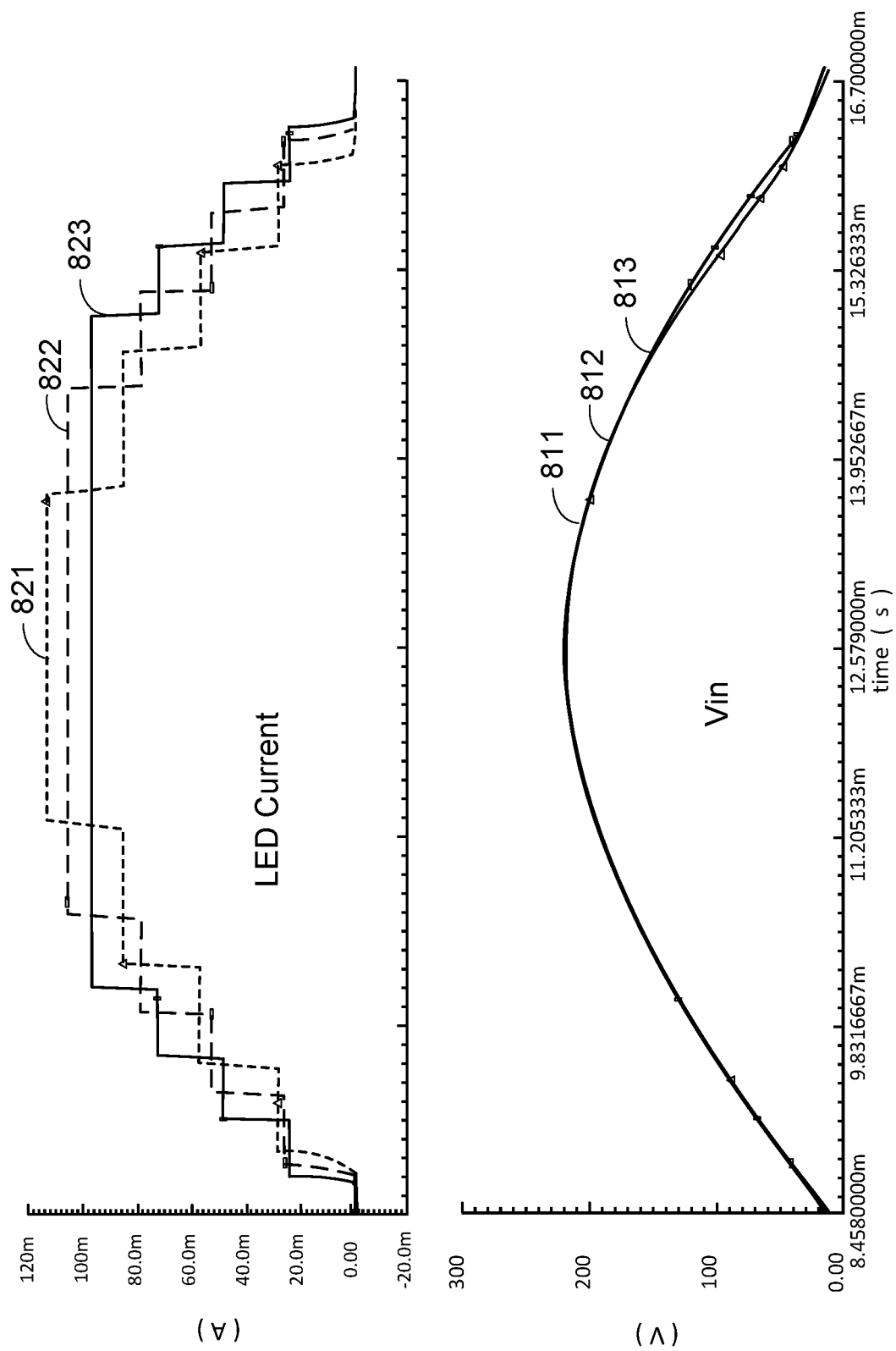
FIG. 8 is a waveform diagram illustrating the operation of another LED control circuit that embodies certain aspects of this invention.

FIG. 8 is a waveform diagram illustrating simulated LED current vs. LED diode forward voltages in an LED controller that embodies certain aspects of this invention. FIG. 8 plots simulated LED current for an LED lighting device having a control circuit 700 of FIG. 7. Control circuit 700 can maintain a constant average LED current under conditions of different diode forward voltages Vf by adjusting the reference voltages REF1-REF4 based on the LED diode forward voltage Vf. For the simulated current waveforms, three different operating temperatures, 0° C., 62.5° C., and 125° C., are used to obtain the different diode forward voltages Vf. The rectified input line voltage VIN is kept constant, as shown by three VIN waveforms 811, 812, and 813. In FIG. 8, waveform 821 represents the LED current waveform at 0° C., waveform 822 represents the LED current waveform at 62.5° C., and waveform 823 represents the LED current waveform at 125° C. It can be seen that LED currents 821, 822, and 823 have the same total current in a half AC cycle as represented by the areas under each current curve. In other words, the average LED current is the same under the conditions of different LED diode forward voltage Vf or different temperatures.

Figure 9:
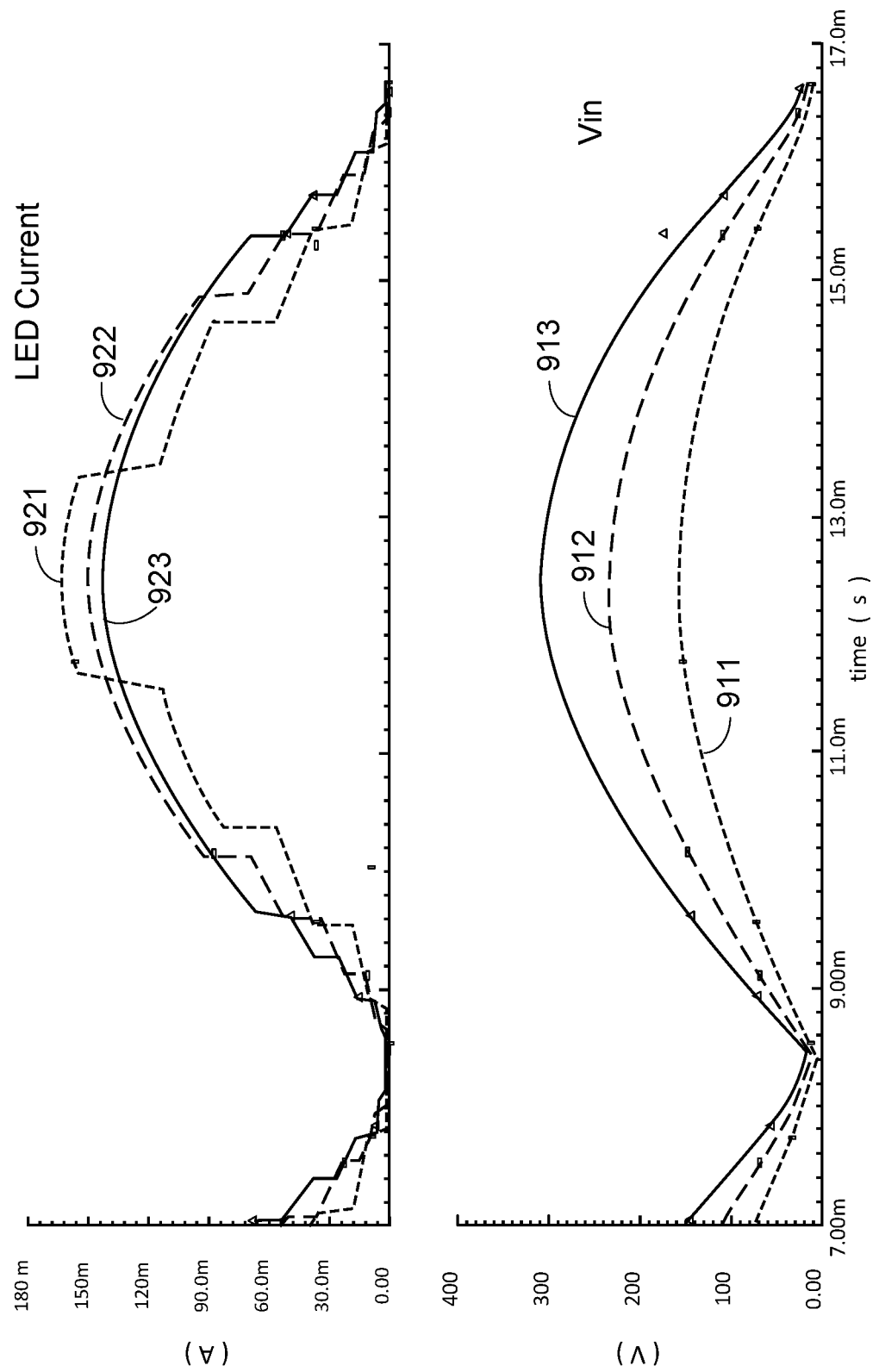
FIG. 9 is waveform diagram illustrating LED current vs. rectified input voltages in an LED controller with adjustable reference voltages that embodies certain aspects of this invention.

FIG. 9 is waveform diagram illustrating LED current vs. rectified input voltages in an LED controller with adjustable reference voltages that embodies certain aspects of this invention. The LED current waveforms are simulated for an LED lighting device having an LED control circuit similar to LED control circuit 500 of FIG. 5. In FIG. 5, LED control circuit 500 has a peak detector VPEAK used to measure the AC peak value for control. The peak voltage value is DC, so that the LED current generated from FIG. 5, as shown in FIG. 6A, has a rectangular waveform in each channel. In contrast, in FIG. 9, the waveforms are derived by adding a non-inventing op-amp to FIG. 5, which measures the AC line voltage at VIN by a voltage divider network. The non-inventing op-amp output is then added to the LED current setting reference voltage that is shown in FIG. 5 through an adder or a multiplier. Because the sampled AC line voltage is sinusoidal, the LED current is in sinusoidal in each channel.

In FIG. 9, rectified input voltage 911 has a peak voltage of 160 V, rectified input voltage 912 has a peak voltage of 235 V, and rectified input voltage 913 has a peak voltage of 311 V. The reference voltages REF1-REF4 are adjusted such that the rectified input voltage 913 with the highest peak voltage of 311 V has the lowest reference voltage, and the rectified input voltage 911 with the lowest peak voltage of 160 V has the highest reference voltage. In FIG. 9, LED current 921 for rectified input voltage 911 with the lowest peak voltage of 160 V, LED current 922 for rectified input voltage 912 with peak voltage of 235 V, and LED current 923 for rectified input voltage 913 with the highest peak voltage of 311 V. It can be seen that LED currents 921, 922, and 923 have the same total current in a half AC cycle as represented by the areas under each current curve. In other words, the average LED current is the same under the conditions of rectified voltages with different peak voltages. As a result, the brightness of the LED lighting device can be maintained.

It is desirable for the ideal AC off-line linear LED lamps to have both high power factor and high efficiency. Unfortunately, power factor and efficiency are uncorrelated, and a tradeoff is often needed. The waveform shown in FIG. 3 is an example of good power factor and good efficiency when LED strings are carefully selected. The waveform shown in FIG. 9 is an example of higher power factor (LED current profile is more in phase with AC input voltage) but with reduced efficiency (current peak coincides with the AC input voltage peak, so that IC has to dissipate maximum power). In another example, the waveform shown in FIG. 10 is an example of reduced power factor (LED current profile is less in phase with AC input voltage), but with higher efficiency (current peaks at the lower AC input voltages, so that IC dissipates less power).

Figure 10:
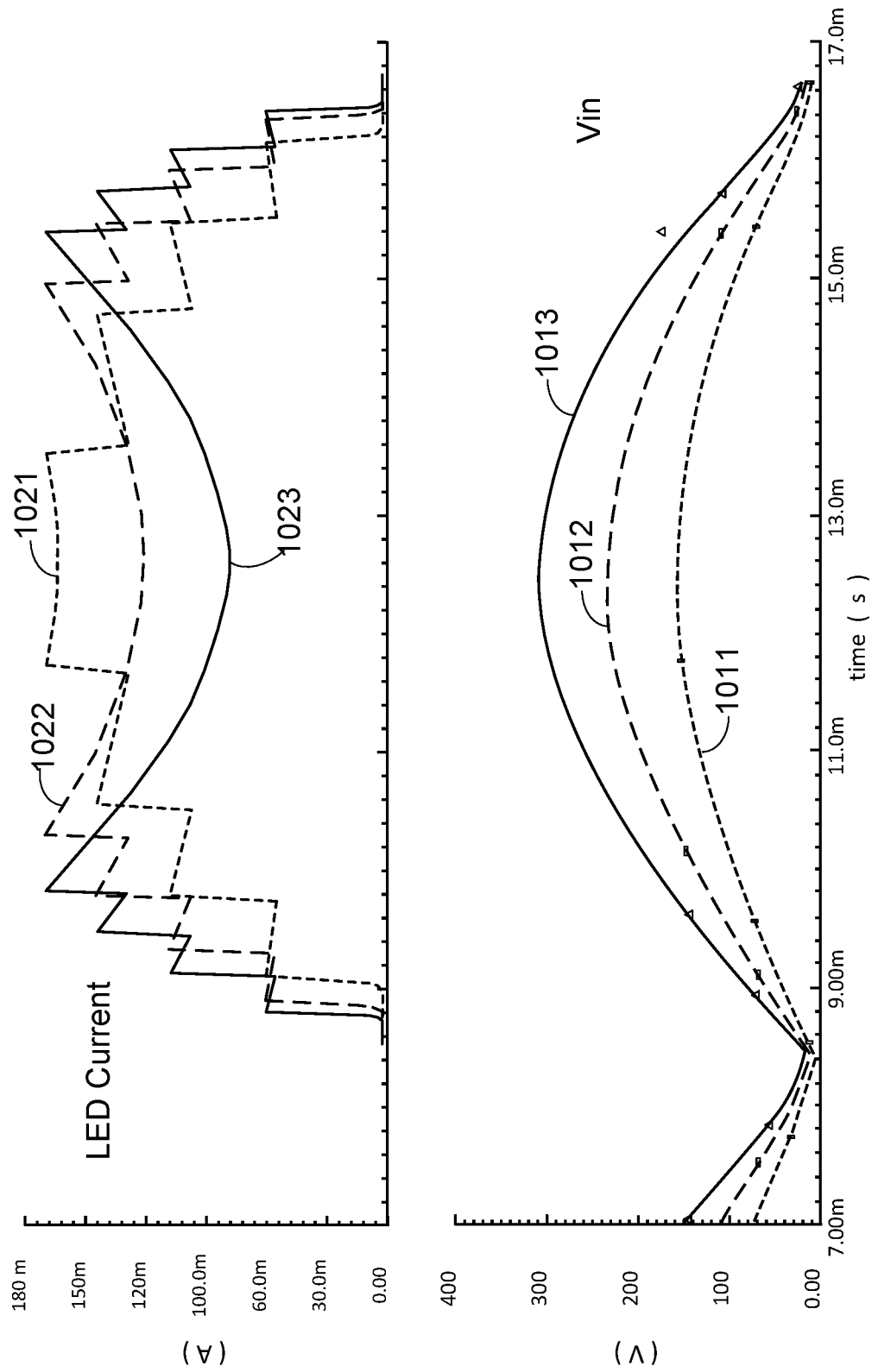
FIG. 10 is waveform diagram illustrating LED current vs. rectified input voltages in another LED controller with adjustable reference voltages that embodies certain aspects of this invention.

FIG. 10 is waveform diagram illustrating LED current vs. rectified input voltages in another LED controller with adjustable reference voltages that embodies certain aspects of this invention. In FIG. 10, rectified input voltage 1011 has a peak voltage of 160 V, rectified input voltage 1012 has a peak voltage of 235 V, and rectified input voltage 1013 has a peak voltage of 311 V. The reference voltages REF1-REF4 are adjusted such that the rectified input voltage 1013 with the highest peak voltage of 311 V has the lowest reference voltage, and the rectified input voltage 1011 with the lowest peak voltage of 160 V has the highest reference voltage. In FIG. 10, LED current 1021 for rectified input voltage 1011 with the lowest peak voltage of 160 V, LED current 1022 for rectified input voltage 1012 with peak voltage of 235 V, and LED current 1023 for rectified input voltage 1013 with the highest peak voltage of 311 V. It can be seen that FIG. 10 is an example of reduced power factor (LED current profile is less in phase with AC input voltage), but with higher efficiency (current peaks at the lower AC input voltages, so that IC dissipates less power). FIG. 10 illustrates waveform diagrams based on an LED lighting device having an LED control circuit similar to LED control circuit 500 of FIG. 5. In FIG. 5, LED control circuit 500 has a peak detector VPEAK used to measure the AC peak value for control. In contrast, the waveforms in FIG. 10 are based on a control circuit in which no peak voltage detector is used. Instead, the AC line voltage at VIN is measured by a voltage divider network for control. The inverting amplifier 543 results in LED current higher at the lower AC input voltages with an anti-sinusoidal profile.

Figure 11:
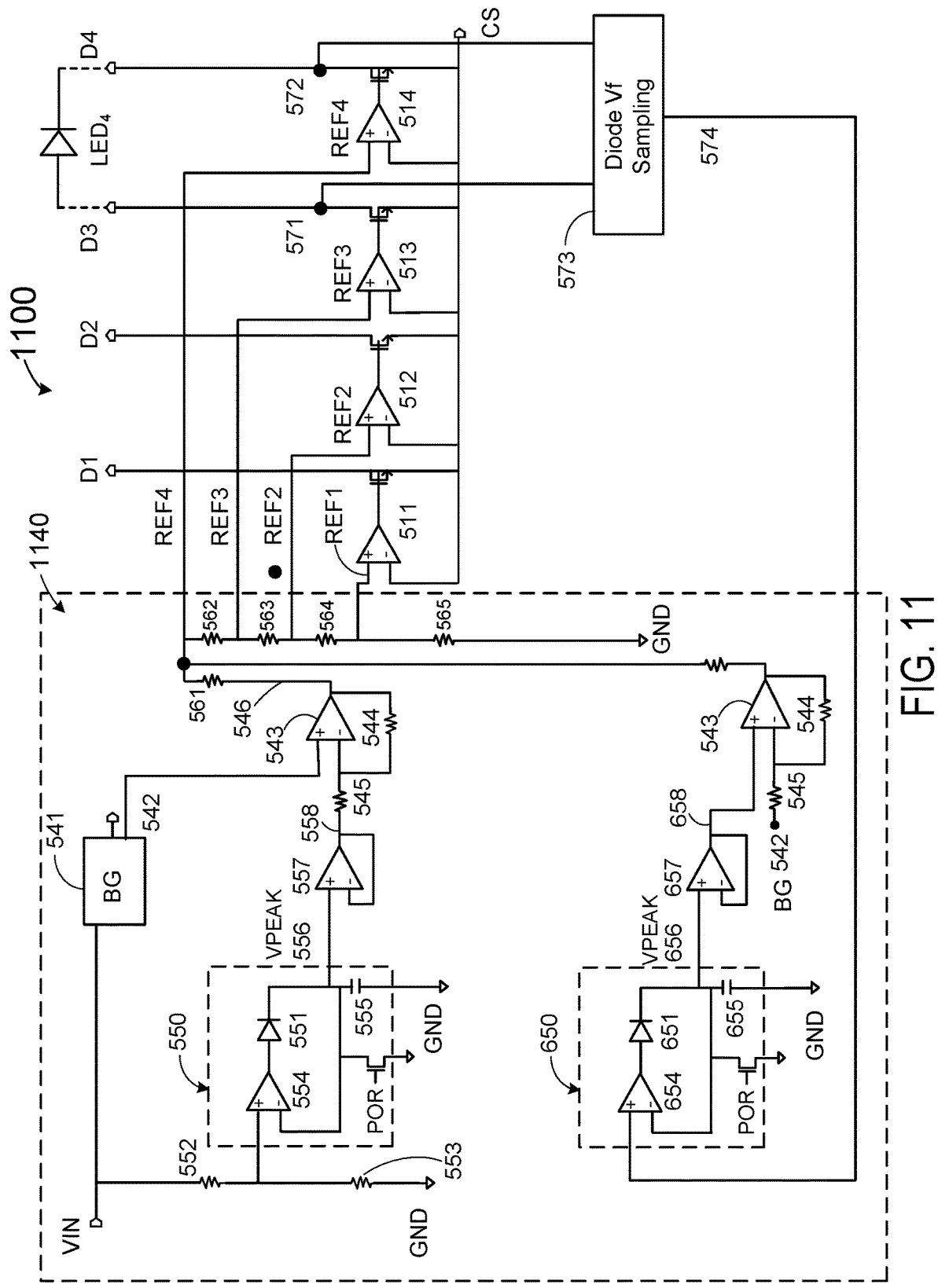
FIG. 11 is a simplified schematic diagram illustrating an LED control circuit that embodies certain aspects of this invention.

FIG. 11 is a simplified schematic diagram illustrating an LED control circuit 1100 that embodies certain aspects of this invention. Control circuit 1100 is another example of a control circuit that can be used in the LED lighting device in FIG. 2. Similar to control circuit 500 in FIG. 5, control circuit 1100 has four terminals D1-D4 for providing current paths to LED strings and four linear regulators 511-514 for controlling the current in each current path, based on one of four reference voltages REF1-REF4. Further, control circuit 1100 also includes a reference voltage generator 1140 for generating the four reference voltages REF1-REF4. The operation of control circuit 1100 is similar to the operation of control circuit 500 described above. Different from control circuit 500, control circuit 1100 illustrates an exemplary implementation of a reference voltage generator 1140 that provides reference voltages REF1-REF4 based on variations of both input voltage VIN and LED diode forward voltage Vf.

Reference voltage generator 1140 is similar to reference voltage generator 540 in FIG. 5, with one notable difference. Reference voltage generator 540 in FIG. 5 generates a signal that represents the input voltage VIN. In contrast, reference voltage generator 1140 in FIG. 11 generates a signal that represents the combined effect of the input line voltage VIN and the LED diode forward voltage Vf.

Reference voltage generator 1140 includes a first peak voltage detector 550 for detecting the variations of rectified input voltage VIN. The first peak voltage detector 550 is similar to peak voltage detector 550 in FIG. 5. Peak voltage detector 550 can be connected to rectified input voltage VIN through a voltage divider formed by resistors 552 and 553. Peak voltage detector 550 can also include an amplifier 554, a diode 551, a power-up reset switch POR, and a capacitor 555 with parasitic discharge path (not shown) so that the peak detector can be reset and detect new peaks, and provides a signal VPEAK 556 representing a sampled version of VIN. Sampled signal VPEAK 556 is buffered at amplifier 557 to provide a signal 558 representing a sampled version of VIN.

Reference voltage generator 1140 has a first operational amplifier 543 with a positive terminal for receiving reference voltage 542 from bandgap reference circuit 541. Amplifier 543 also has a negative terminal for receiving input voltage sampling signal 558 and. Amplifier 543, along with resistors 544 and 545 provides a first reference voltage 546 that tracks the variation of VIN.

In addition, reference voltage generator 1140 also generates a signal that can represent the LED diode forward voltage Vf. In this regard, similar to reference voltage generator 740 in FIG. 7, reference voltage generator 1140 includes a diode Vf sampling circuit 573 that is coupled to two nodes D3 and D4 across the LED4 diode. The coupling points are marked as 571 and 572. Diode Vf sampling circuit 573 can include circuit components such as a level shifter to produce a voltage signal 574 that represents the diode forward voltage Vf and is scaled properly for a second peak voltage detection circuit 650, which can be similar to a peak voltage detection circuit 550. Peak voltage detector 650 can include an amplifier 654, a diode 651, a power-up reset switch POR, and a capacitor 655 with parasitic discharge path (not shown) so that the peak detector can be reset and detect new peaks, and provides a signal VPEAK 656 representing a sampled version of Vf. Sampled signal VPEAK 656 is buffered at amplifier 657 to provide a signal 658 representing a sampled version of LED diode forward voltage Vf.

In FIG. 11, a second operational amplifier 643 has a positive terminal for receiving LED diode forward voltage Vf sampling signal 658. Amplifier 543 also has a negative terminal for receiving reference voltage 542 from bandgap reference circuit 541. Amplifier 643, along with resistors 644 and 645 provides a second reference voltage 646 that tracks the variation of LED diode forward voltage Vf.

Reference voltage generator 1140 includes an output node 1166, which is coupled to the first reference voltage 546 through a resistor 561 to track the variation of VIN. Output node 1166 is also coupled to the second reference voltage 646 that tracks the variation of LED diode forward voltage Vf. The reference voltage generator is configured to, in response to the rectified input AC voltage, decrease each of the plurality of reference voltages when the sampled voltage signal is increased, and increase each of the plurality of reference voltages when the sampled voltage signal is decreased. The reference voltage generator is configured to, in response to the LED diode forward voltage, increase each of the plurality of reference voltages when the sampled voltage signal is increased, and decrease each of the plurality of reference voltages when the sampled voltage signal is decreased.

A voltage divider, including resistors 562, 563, 564, and 565, is coupled to output node 1166 and provides the reference voltages REF1-REF4 to the linear regulators 511-514. In this circuit, the condition REF1<REF2<REF3<REF4 is met. The resistance values of resistors 561-565 and 661 can be selected based on the desired voltage values of REF1-REF4.

Figure 12:
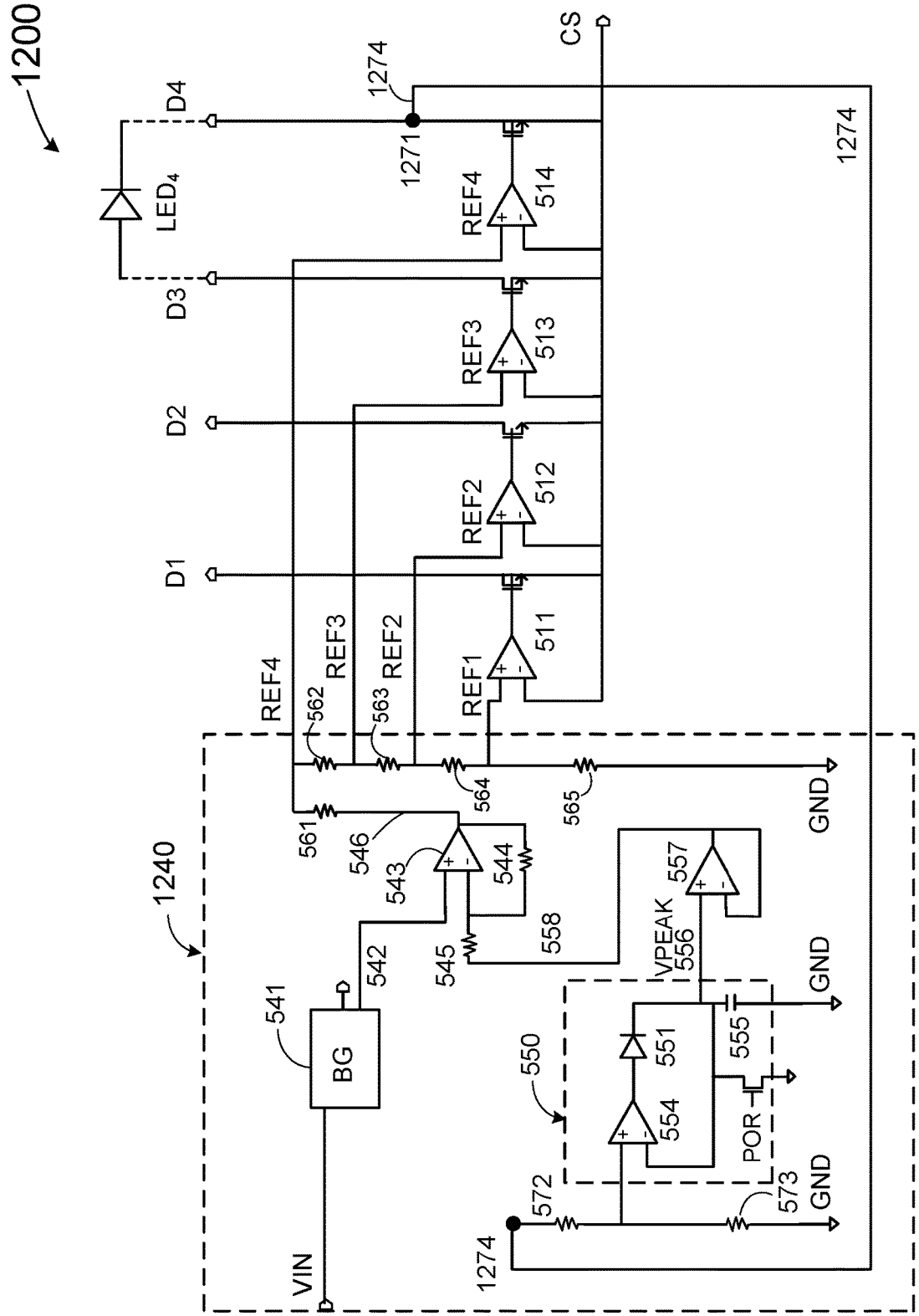
FIG. 12 is a simplified schematic diagram illustrating an LED control circuit 1200 that embodies certain aspects of this invention.

FIG. 12 is a simplified schematic diagram illustrating an LED control circuit 1200 that embodies certain aspects of this invention. Control circuit 1200 is another example of a control circuit that can be used in the LED lighting device in FIG. 2. Similar to control circuit 500 in FIG. 5, control circuit 1200 has four terminals D1-D4 for providing current paths to LED strings and four linear regulators 511-514 for controlling the current in each current path, based on one of four reference voltages REF1-REF4. Further, control circuit 1200 also includes a reference voltage generator 1240 for generating the four reference voltages REF1-REF4. The operation of control circuit 1200 is similar to the operation of control circuit 500 described above. Different from control circuit 500, control circuit 1200 illustrates an exemplary implementation of a reference voltage generator 1240 that provides reference voltages REF1-REF4 based on variations of both input voltage VIN and LED diode forward voltage Vf.

Reference voltage generator 1240 is similar to reference voltage generator 540 in FIG. 5, with one notable difference. Reference voltage generator 540 in FIG. 5 generates a signal that represents the input voltage VIN. In contrast, reference voltage generator 1240 in FIG. 12 generates a signal that represents the combined effect of the input line voltage VIN and the LED diode forward voltage Vf. As shown in FIG. 12, reference voltage generator 1240 includes a sampling node 1271 coupled to D4 at one end of the LED4 diode. A voltage signal 1274 at sampling node 1271 can vary, and represents a sample of the input line voltage VIN and the diode forward voltage Vf.

As shown in FIG. 12, voltage signal 1274 is scaled by a voltage divider (resistors 1272 and 1273) for peak voltage detection circuit 550. Similar to reference voltage generator 540 in FIG. 5, reference voltage generator 1240 modifies reference voltages REF1-REF4 that are used to control the linear regulators 511-514. In this circuit, the condition REF1<REF2<REF3<REF4 is met. The resistance values of resistors 561-565 can be selected based on the desired voltage values of REF1-REF4 and the voltage 1274 at node 1271.

Figure 13:
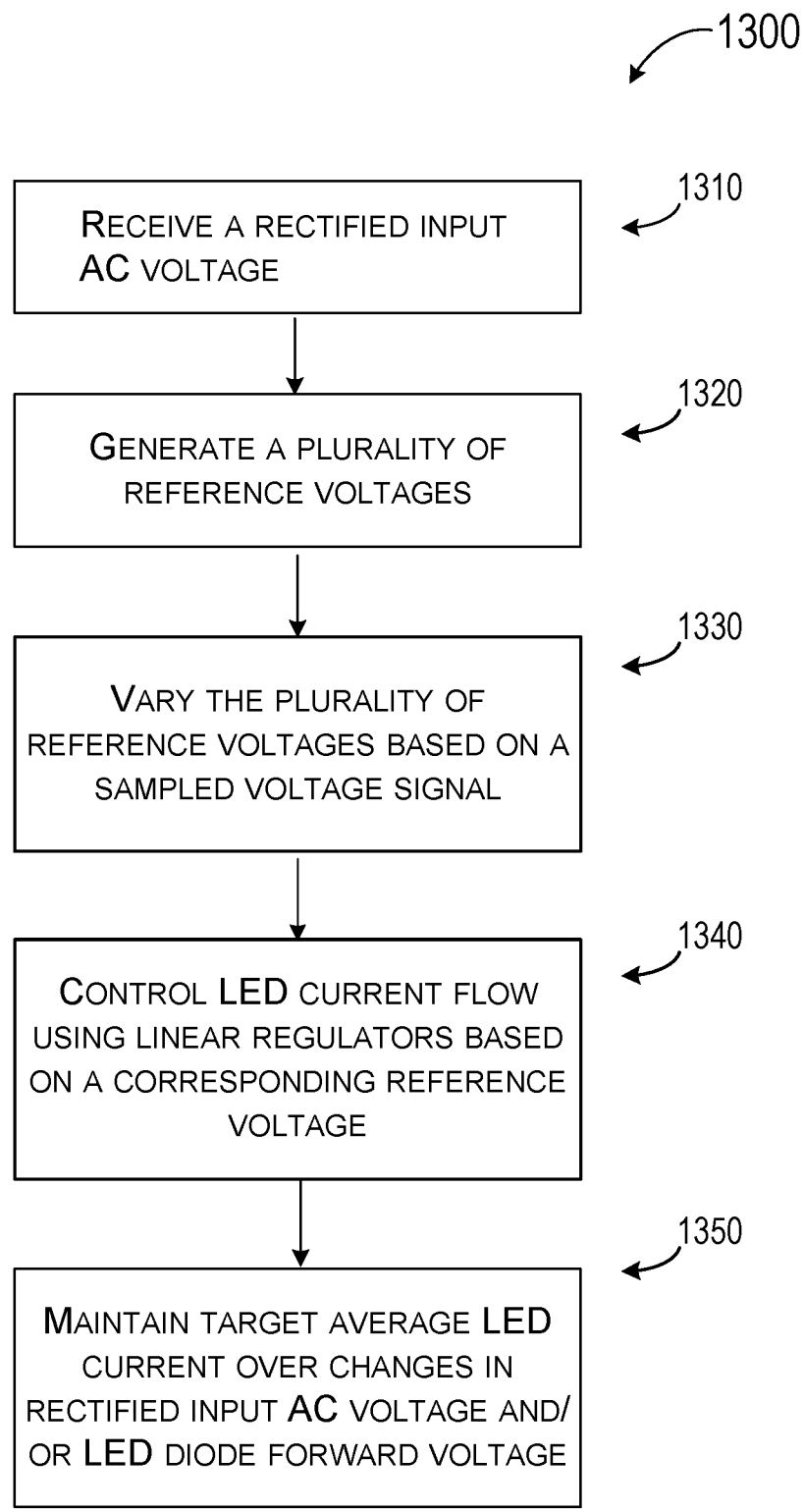
FIG. 13 is a flowchart illustrating a method for controlling a plurality of serially-connected LED strings.

FIG. 13 is a flowchart illustrating a method for controlling a plurality of serially-connected LED strings. The method includes receiving a rectified input AC (alternating current) voltage (Step 1310), and generating a plurality of reference voltages (Step 1320). The method also includes varying the plurality of reference voltages based on a sampled voltage signal (Step 1330). The sampled voltage signal can represent one or both of a peak voltage of the rectified input AC voltage and a peak voltage of an LED diode forward voltage Vf. The method further includes controlling current flow in each of the plurality of LED strings to be in phase with the rectified input AC voltage using one of a plurality of linear regulators based on a corresponding reference voltage (Step 1340). At Step 1350, the method includes maintaining a target average LED current over changes in the rectified input AC voltage and/or the LED diode forward voltage.

Method 1300 as outlined above can be implemented to regulate LED current to be in phase with the rectified AC voltage, thereby providing a high power factor, using system 200 of FIG. 2, system 500 of FIG. 5, system 700 of FIG. 7, system 1100 of FIG. 11, or system 1200 of FIG. 12. Method 1300 can be used to maintain a constant average LED current and therefore, a constant brightness, over changes in operating conditions. Further, method 1300 can be implemented to maintain a constant average LED current over variations in the rectified AC voltage, as described in system 500 of FIG. 5. Method 1300 can also be implemented to maintain a constant average LED current over variations in the LED diode forward voltage Vf, as described in system 700 of FIG. 7. Further, method 1300 can also be implemented to maintain a constant average LED current over variations in the rectified AC voltage and over variations in the LED diode forward voltage Vf, as described in system 1100 of FIG. 11 and system 1200 of FIG. 12.

What is claimed is:

1. A controller for controlling a light-emitting diode (LED) string that includes one or more light-emitting diodes connected in series, the controller comprising:
   an input node for receiving a rectified input AC (alternating current) voltage;
   a common current sense node for sensing current flow in the LED string;
   a reference voltage generator configured to generate a reference voltage, the reference voltage generator further configured to vary the reference voltage based on a sampled voltage signal, the sampled voltage signal comprising one or both of a peak voltage of the rectified input AC voltage and a peak voltage of an LED diode forward voltage, wherein the reference voltage generator is configured to:
   respond to one or both of a peak voltage of the rectified input AC voltage and a peak voltage of an LED diode forward voltage;

in response to the rectified input AC voltage, decrease the reference voltage when the sampled voltage signal is increased, and increase the reference voltage when the sampled voltage signal is decreased; and when responding to the LED diode forward voltage, increase the reference voltage when the sampled voltage signal is increased, and decrease the reference voltage when the sampled voltage signal is decreased;

a linear regulator, coupled between a cathode of the LED string and a common current sense node, the linear regulator configured to control a current through the LED string based the reference voltage;

wherein the controller is configured to regulate a current through the LED string to be in phase with the rectified input AC voltage and to maintain a target average LED current over changes in one or both of the rectified input AC voltage and the LED diode forward voltage.

2. The controller of claim 1, wherein the reference voltage generator is coupled to the rectified AC input voltage to receive the sampled voltage signal.

3. The controller of claim 2, wherein the reference voltage generator comprises:
a band-gap voltage generator for providing a band-gap reference voltage;
a peak voltage detector for coupling to the sampled voltage signal and to provide a peak voltage signal of the sampled voltage signal;
an operational amplifier having:
a positive input node coupled to the band-gap reference voltage;
a negative input node coupled to the sampled voltage signal; and
an output node providing a base reference voltage that varies inversely with the sampled voltage signal.

4. The controller of claim 1, wherein the reference voltage generator is coupled to a diode forward voltage sampling circuit to receive a sampled voltage signal that represents an LED diode forward voltage signal from an LED diode in an LED string.

5. The controller of claim 4, wherein the reference voltage generator comprises:
a band-gap voltage generator for providing a band-gap reference voltage;
a peak voltage detector for coupling to the sampled voltage signal and providing a peak voltage signal of the sampled voltage signal;
an operational amplifier having:
a negative input node coupled to the band-gap reference voltage;
a positive input node coupled to the sampled voltage signal; and
an output node providing a base reference voltage that varies proportionally with the sampled voltage signal.

6. The controller of claim 1, wherein the reference voltage generator is coupled to the rectified AC input voltage to receive a first sampled voltage signal, and the reference voltage generator is coupled to a diode forward voltage sampling circuit to receive a second sampled voltage signal that represents an LED diode forward voltage signal from an LED diode in an LED string.

7. The controller of claim 6, wherein the reference voltage generator comprises:
a band-gap voltage generator for providing a band-gap reference voltage;
a first peak voltage detector for coupling to first sampled voltage signal and providing a first peak voltage signal of the first sampled voltage signal;
a first operational amplifier having:
a positive input node coupled to the band-gap reference voltage;
a negative input node coupled to the first peak voltage signal; and
a second peak voltage detector for coupling to the second sampled voltage signal and providing a second peak voltage signal of the sampled voltage signal;
a second operational amplifier having:
a negative input node coupled to the band-gap reference voltage;
a positive input node coupled to the second peak voltage signal; and
an output node coupled to both the first operational amplifier and the second operational amplifier to provide a base reference voltage that varies with the first sampled voltage signal and the second sampled voltage signal.

8. The controller of claim 1, wherein the reference voltage generator is coupled to a cathode of an LED diode to receive the sampled voltage signal that represents the rectified AC input voltage and LED diode forward voltage signal.

9. The controller of claim 1, wherein the reference voltage generator further comprises a voltage divider circuit for receiving a base reference voltage and generating the reference voltage.

10. The controller of claim 1, wherein the linear regulator comprises:
a transistor for controlling current flow in a current path;
an operational amplifier having a first input terminal and a second input terminal, configured to:
receive at the first input terminal a preset reference voltage;
receive at the second input terminal a feedback signal from the current path; and
output a control signal for controlling current flow in the current path.

11. The controller of claim 1, wherein to maintain a target average LED current comprises maintaining an average LED current to within 1% to 10% of a target average LED current.

12. The controller of claim 1, wherein an LED string comprises one or more light-emitting diodes.

13. An LED (light-emitting diode) lighting device, comprising:
a rectifier circuit for rectifying an input AC (alternating current) voltage for providing a rectified input AC voltage;
a plurality of serially-connected LED strings;
a reference voltage generator configured to generate a plurality of reference voltages, the reference voltage generator further configured to vary the plurality of reference voltages based on a sampled voltage signal, the sampled voltage signal comprising both a peak voltage of the rectified input AC voltage and a peak voltage of an LED diode forward voltage; and
a plurality of linear regulators, each linear regulator coupled between a cathode of a corresponding LED string and a common current sense node, wherein each linear regulator is configured to regulate a current through a corresponding LED string according to a corresponding reference voltage.

14. The device of claim 13, wherein the reference voltage generator is configured to:
in response to the rectified input AC voltage, decrease each of the plurality of reference voltages when the sampled voltage signal is increased, and increase each of the plurality of reference voltages when the sampled voltage signal is decreased; and in response to the LED diode forward voltage, increase each of the plurality of reference voltages when the sampled voltage signal is increased, and decrease each of the plurality of reference voltages when the sampled voltage signal is decreased.

15. The device of claim 13, wherein the reference voltage generator comprises:
    a band-gap voltage generator for providing a band-gap reference voltage;
    a first peak voltage detector for coupling to a first sampled voltage signal and providing a first peak voltage signal of the first sampled voltage signal;
    a first operational amplifier having:
    a positive input node coupled to the band-gap reference voltage;
    a negative input node coupled to the first peak voltage signal; and
    a second peak voltage detector for coupling to a second sampled voltage signal and providing a second peak voltage signal of the sampled voltage signal;
    a second operational amplifier having:
    a negative input node coupled to the band-gap reference voltage;
    a positive input node coupled to the second peak voltage signal; and
    an output node coupled to both the first operational amplifier and the second operational amplifier to provide a reference voltage that varies with the first sampled voltage signal and the second sampled voltage signal.

16. The device of claim 13, wherein the plurality of serially-connected LED strings comprises three serially-connected LED strings, each LED string including one or more light-emitting diodes.

17. The device of claim 13, wherein the reference voltage generator is coupled to a diode forward voltage sampling circuit to receive the sampled voltage signal that represents an LED diode forward voltage signal from an LED diode in an LED string.

18. A method for controlling a plurality of serially-connected LEDs (light-emitting diodes), the method comprising:
    receiving a rectified input AC (alternating current) voltage;
    generating a reference voltage;
    varying the reference voltage based on a sampled voltage signal, the sampled voltage signal comprising a peak voltage of the rectified input AC voltage and a peak voltage of an LED diode forward voltage;
    controlling current flow in the plurality of LEDs to be in phase with the rectified input AC voltage using a plurality of linear regulators based on the reference voltage; and
    maintaining a target average LED current over changes in the rectified input AC voltage and the LED diode forward voltage.

19. The method of claim 18, wherein varying the reference voltage based on the sampled voltage signal comprises:
    in response to the rectified input AC voltage, decreasing the reference voltage when the sampled voltage signal is increased, and increasing the reference voltage when the sampled voltage signal is decreased; and
    in response to the LED diode forward voltage, increasing the reference voltage when the sampled voltage signal is increased, and decreasing the reference voltage when the sampled voltage signal is decreased.

20. The method of claim 18, further comprising receiving the sampled voltage signal that represents the rectified AC input voltage and LED diode forward voltage signal.

* * * * *